US011002586B2

(12) United States Patent
Rondano et al.

(10) Patent No.: US 11,002,586 B2
(45) Date of Patent: May 11, 2021

(54) DEVICE AND METHOD FOR DETECTING THE LEVEL OF A MEDIUM

(71) Applicant: ELTEK S.P.A., Casale Monferrato (IT)

(72) Inventors: Matteo Rondano, Casale Monferrato (IT); Mauro Zorzetto, Casale Monferrato (IT); Enrico Chiesa, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 164 days.

(21) Appl. No.: 16/065,571

(22) PCT Filed: Dec. 23, 2016

(86) PCT No.: PCT/IB2016/057986
§ 371 (c)(1),
(2) Date: Jun. 22, 2018

(87) PCT Pub. No.: WO2017/109765
PCT Pub. Date: Jun. 29, 2017

(65) Prior Publication Data
US 2019/0186978 A1 Jun. 20, 2019

(30) Foreign Application Priority Data
Dec. 24, 2015 (IT) .......................... 102015000087789

(51) Int. Cl.
*G01F 23/26* (2006.01)
*G01F 25/00* (2006.01)
*G01F 23/00* (2006.01)

(52) U.S. Cl.
CPC ........ *G01F 23/265* (2013.01); *G01F 23/0092* (2013.01); *G01F 25/0061* (2013.01)

(58) Field of Classification Search
CPC . G01F 23/265; G01F 23/0092; G01F 25/0061
(Continued)

(56) References Cited

U.S. PATENT DOCUMENTS

| 4,003,259 A | * | 1/1977 | Hope | .................... | G01F 23/263 |
| | | | | | 73/304 C |
| 4,589,077 A | | 5/1986 | Pope | | |

(Continued)

FOREIGN PATENT DOCUMENTS

| WO | 1996/033393 | 10/1996 |
| WO | 2015/181770 | 12/2015 |

OTHER PUBLICATIONS

International Search Report and Written Opinion of the ISA for PCT/IB2016/057986, dated Apr. 12, 2017, 15 pages.

*Primary Examiner* — Nimeshkumar D Patel
*Assistant Examiner* — Jean F Morello
(74) *Attorney, Agent, or Firm* — Nixon & Vanderhye P.C.

(57) ABSTRACT

A capacitive level-sensor device, for detecting the level of at least one medium contained in a container comprises:
  a detection part that includes an array of capacitive elements, the array of capacitive elements comprising at least one set of electrodes on a substrate, the electrodes being set at a distance from one another according to a level-detection axis, the detection part including at least one insulating layer for electrically insulating the electrodes with respect to the medium; and
  a control circuit having a plurality of first inputs, electrically connected to which are the electrodes.
The control circuit is prearranged for carrying out a sequential sampling of the inputs of the plurality of first inputs and for comparing a value representing the capacitance associated to each electrode with at least one corresponding reference threshold.
The detection part further comprises at least one temperature sensor, connected to at least one respective second input of the control circuit.

(Continued)

The control circuit is moreover prearranged for carrying out a compensation of at least one of the following:
- the value representing electrical capacitance associated to each electrode;
- a value indicating the medium facing each electrode and the at least one reference threshold, according to information representing at least one temperature value acquired on the at least one second input.

20 Claims, 12 Drawing Sheets

(58) Field of Classification Search
USPC .......................................................... 73/292
See application file for complete search history.

(56) References Cited

U.S. PATENT DOCUMENTS

| | | | |
|---|---|---|---|
| 6,101,873 A * | 8/2000 | Kawakatsu | G01F 23/268 73/304 C |
| 7,219,545 B2 * | 5/2007 | Salzmann | G01F 23/242 73/290 R |
| 2005/0280424 A1 | 12/2005 | Qu et al. | |
| 2017/0299416 A1 * | 10/2017 | Rondano | G01F 23/266 |

* cited by examiner

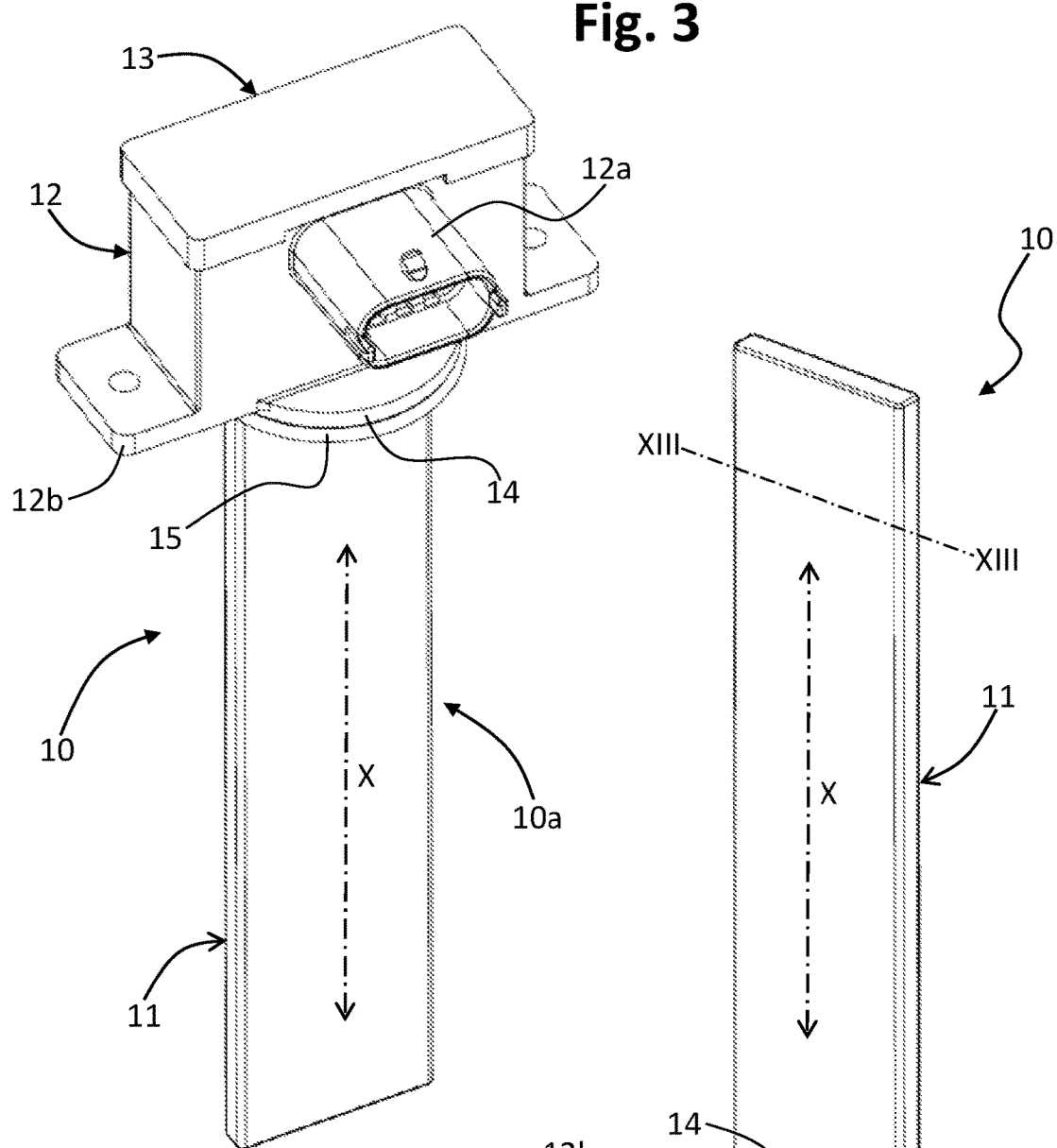
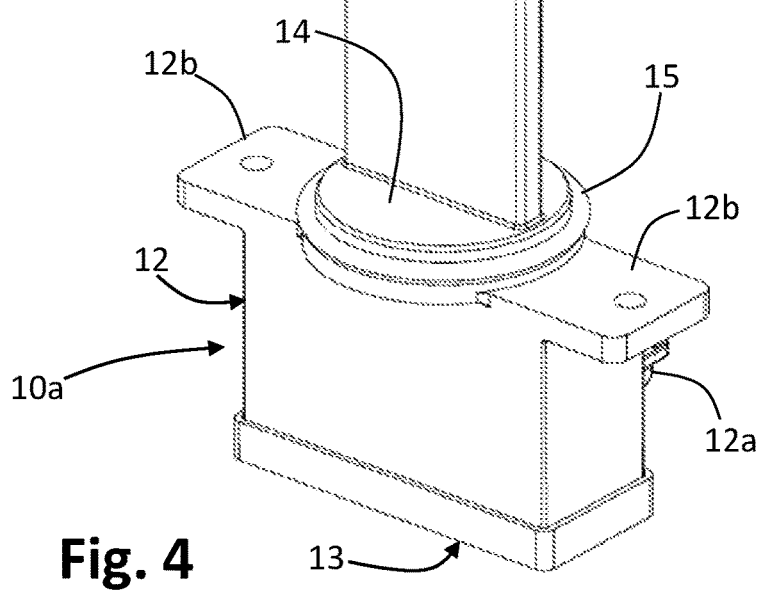

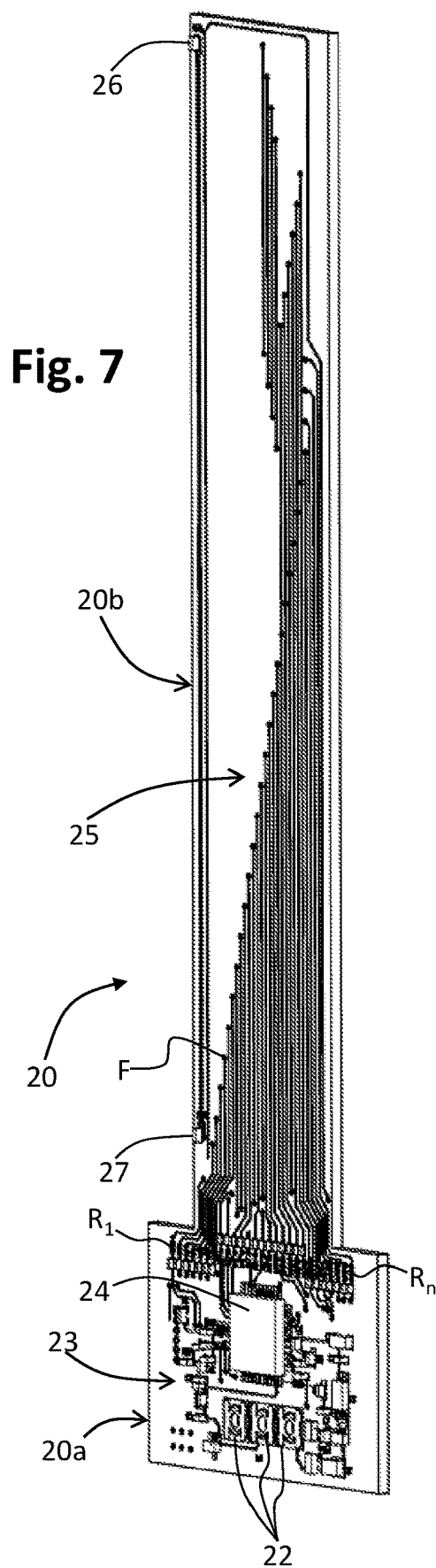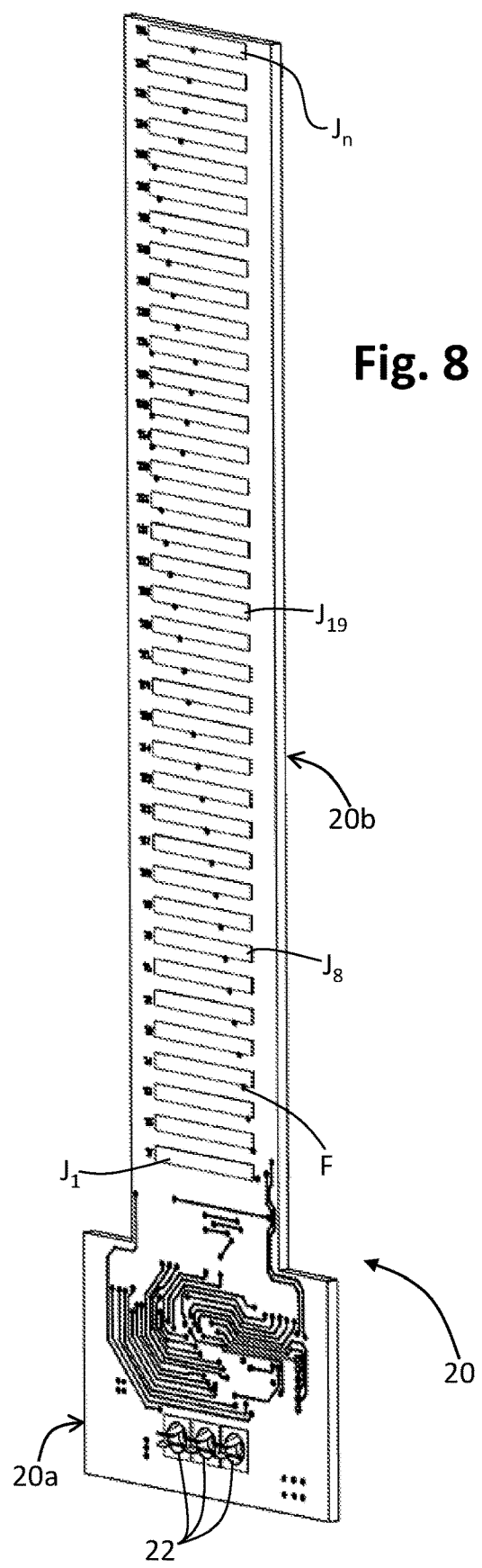

DEVICE AND METHOD FOR DETECTING THE LEVEL OF A MEDIUM

This application is the U.S. national phase of International Application No. PCT/IB2016/057986 filed Dec. 23, 2016, which designated the U.S. and claims priority to IT Patent Application No. 102015000087789 filed Dec. 24, 2015, the entire contents of each of which are hereby incorporated by reference.

FIELD OF THE INVENTION

The present invention relates to a sensor device for detecting the level of a generic medium, such as a liquid, a fluid substance, a powdery material, or a material in the loose or bulk state, etc. The invention has been developed with particular reference to level sensors of a capacitive type used on vehicles.

PRIOR ART

Level sensors are used in various contexts for detecting a residual quantity of a liquid present in a generic container, such as a tank. Some types of these sensors are based upon the use of a float, whereas other types are based upon the measurement of electrical quantities, such as conductivity/resistivity or capacitance.

Some types of capacitive level sensors are used in motor-vehicle tanks or reservoirs, in particular ones designed to contain a fuel or an additive, such as a solution with ethanol or urea. In these cases, often operatively associated to the tank is a heater device, which can be activated to prevent freezing of the liquid or to thaw liquid that is already frozen.

A sensor device of a capacitive type is, for example, known from WO2015/181770 A, upon which the preamble of Claim 1 is based. In this solution, the level sensor comprises at least one temperature sensor, used for detecting environmental conditions and for possibly compensating mathematically the information on the measurement of level, in particular in the case of applications at critical temperatures, where the use of a differential measurement with a reference electrode might not be sufficient to guarantee compensation of the error.

The above known sensor device is affected to a certain extent by problems linked to the low and high temperatures at which the sensor itself has to operate, including conditions of freezing of the liquid and conditions of heating of the liquid. In particular, the measurements carried out by the known sensor may prove to be imprecise in those conditions in which the liquid contained in the tank assumes different temperatures at different heights, given that the values of capacitance or impedance detected via the capacitive elements of the sensor vary as a function of temperature. Consider, for example, the case of a tank containing a mass of urea solution frozen only in part and unfrozen only in a bottom area close to a heater. The temperatures of the liquid will vary between the heating temperature in the proximity of the heater (e.g., 60° C.) and the thawing temperature in the proximity of the area still frozen (e.g., 0° C.). The known capacitive sensor hence presents the drawback of not enabling precise measurements and is subject to environmental disturbance.

SUMMARY AND OBJECT OF THE INVENTION

In its general terms, the present invention aims to provide a level-sensor device that is simple and inexpensive to produce, distinguished by a high flexibility of use and production, and substantially be immune from the problems highlighted above. This and other aim still, which will emerge more clearly hereinafter, are achieved, according to the invention, by a level-sensor device and by a corresponding method that present the characteristics specified in the annexed claims. The claims constitute an integral part of the technical teaching provided herein in relation to the invention.

BRIEF DESCRIPTION OF THE DRAWINGS

Further purposes, characteristics, and advantages of the invention will emerge from the ensuing description, with reference to the annexed drawings, which are provided purely by way of non-limiting example and in which:

FIGS. 3 and 4 are schematic perspective views, from different angles, of a level-sensor device according to one embodiment of the invention;

FIGS. 7 and 8 are schematic perspective views from different angles of a circuit of a level-sensor device according to a possible embodiment of the invention;

DESCRIPTION OF PREFERRED EMBODIMENTS OF THE INVENTION

Reference to "an embodiment" or "one embodiment" in the framework of this description is intended to indicate that a particular configuration, structure, or characteristic described in relation to the embodiment is comprised in at least one embodiment. Hence, phrases such as "in an embodiment", "in one embodiment", and the like, that may be present in various points of this description do not necessarily refer to one and the same embodiment, but may instead refer to different embodiments. Furthermore, particular conformations, structures, or characteristics defined in the present description may be combined in any adequate way in one or more embodiments, even different from the ones represented. The reference numbers and spatial references (such as "top", "bottom", "upper", "lower", "front", "back", "vertical", etc.) appearing herein are used merely for convenience and hence do not define the sphere of protection or the scope of the embodiments.

In the present description, the term "gradient" is meant to denote a distribution of different values that can be assumed by a quantity in at least one direction, or a vector function of a scalar field. In what follows, this term is preferably referred to a temperature gradient, i.e., to a temperature variation in at least one direction, such as a measuring axis of the level-sensor device. The concepts expressed and linked to the "gradient" could, however, also refer to other quantities or values, such as a gradient or variation of the composition of the fluid or liquid along the level-sensor device.

In the figures, the same reference numbers are used to designate elements that are similar or technically equivalent to one another.

Figure 1:
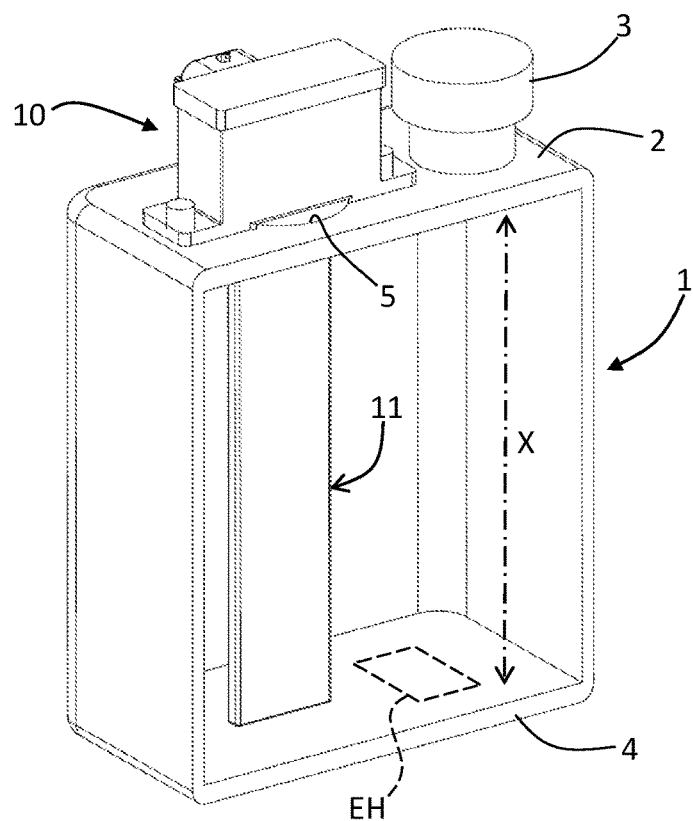
FIGS. 1 and 2 are schematic perspective views, partially sectioned, of two possible alternative configurations of installation of a level-sensor device according to the invention on a generic container, such as a tank.

In FIG. 1, the reference number 1 designates as a whole a generic container, in particular a tank, for a generic fluid medium or a material in the loose or bulk state. The tank 1 has a main body preferably made of electrically insulating plastic material. A heater of type in itself known may possibly be associated to the tank 1, which is used to heat the tank itself and/or its contents, for example in the event of freezing. An electrical heater is represented schematically in the figures by the block designated by EH.

The tank 1 may, for example, be a tank that equips a motor vehicle. In one embodiment, such as the one exemplified herein, the tank 1 is to equip a vehicle with a diesel engine, and the liquid contained in the tank 1 is a reducing agent, such as a urea solution in aqueous solution, for example of the type commercially known as AdBlue (i.e., a urea solution at approximately 32.5% in demineralized water), used by an SCR (Selective Catalyst Reduction) system, i.e., a system for reducing the emissions of nitrogen oxides in the exhaust gases produced by a diesel engine.

In the schematic example illustrated, the tank 1 has an upper wall 2, where an opening is provided with a filler cap 3 for topping-up with the liquid. A wall of the tank 1, for example its bottom wall 4, then has an outlet opening, not visible, via which the liquid comes out or is drawn in, for example via a pump, to supply the liquid to the SCR system. Once again at the upper wall 2, the tank 1 has a second opening, designated by 5, where it is sealingly fixed to the body of a level-sensor device according to a possible embodiment of the invention. The level-sensor device, designated as a whole by 10 and hereinafter also referred to simply as "level sensor", is mounted so as to extend according to an axis of detection of the level, designated by X, which is preferably substantially vertical but, if need be, may be inclined with respect to the vertical.

The sensor 10 has a detection part 11, which is to extend at least partially within the tank 1. The distal end region of the detection part 11 is preferentially in contact with or at a slight distance from the bottom wall 4 of the tank, i.e., at a height very close to that of the opening for outlet or intake of the liquid in order to be able to detect the presence of an even very low level in the tank. Preferentially, the proximal end region of the detection part 11 extends within the tank 1 at a height relatively close to the upper wall 2. In the embodiment illustrated, the body of the sensor 10 has, in its upper part, elements for being fixed to the upper wall 2 of the tank. In the example, these means are represented by flange formations with associated screws (not indicated). This embodiment is not, however, to be considered in any way limiting, there being possible also different solutions for fixing the body of the sensor 10, some of which are exemplified hereinafter.

Figure 2:
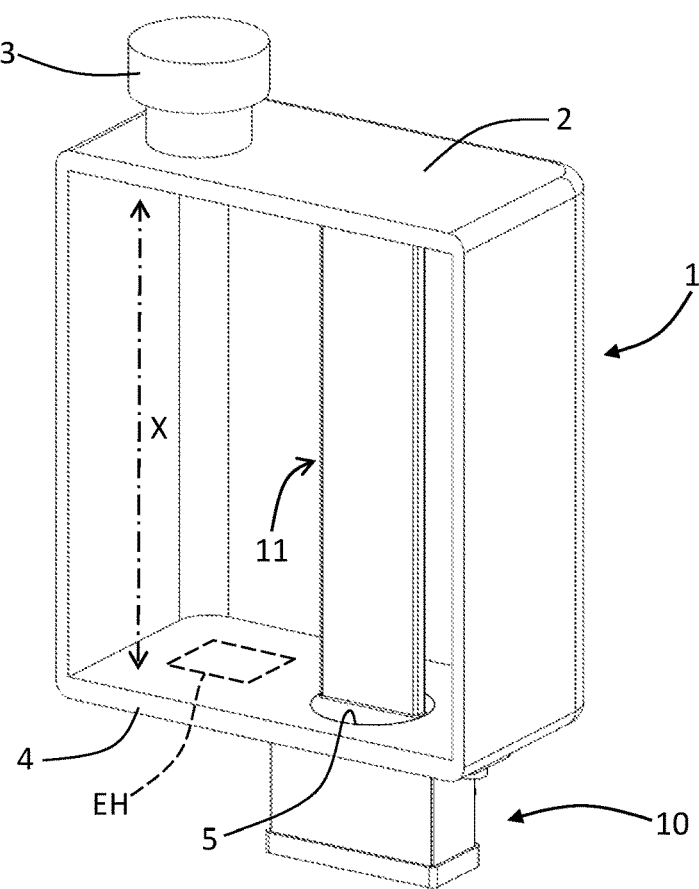

In the example of FIG. 1, the sensor 10 is fixed from above, i.e., associated to the upper wall 2 of the tank. In other embodiments, however, the sensor may be fixed from beneath, i.e., to the bottom wall 4. An embodiment of this type is illustrated schematically in FIG. 2, where the sensor 10 is sealingly mounted at the opening 5, here defined in the bottom wall 4. Also in this embodiment, a proximal end region of the detection part 11 (which here may be defined as "lower") is in a position close to the bottom wall 4, whereas the distal end region (which here may be defined as "upper") is located at a height relatively close to the upper wall 2.

In FIGS. 3 and 4, a sensor 10 according to an embodiment is represented in isolation, at different angles. At the proximal end of the part 11 the body 10*a* of the sensor 10 defines a boxlike housing 12, which also includes a generally hollow connector body 12*a*, provided with electrical terminals referred to hereinafter, preferably projecting from a side wall of the housing. The housing 12 is preferably provided with a closing lid 13, which can be secured in a sealed position, for example via a weld between the plastic material of the housing 12 and that of the lid 13.

Between the housing 12 and the part 11, the body 10*a* of the sensor 10 preferentially defines a portion or formation 14 for sealed coupling to the respective opening for installation on the tank. The formation 14 defines at least one seat for at least one sealing element 15, which can possibly perform also functions of elastic installation of the sensor 10 with respect to the tank. In FIGS. 3 and 4, designated then by 12*b* are the already mentioned flange formations for fixing the body 10*a* of the sensor, here defined at the bottom of the housing 12.

Figure 5:
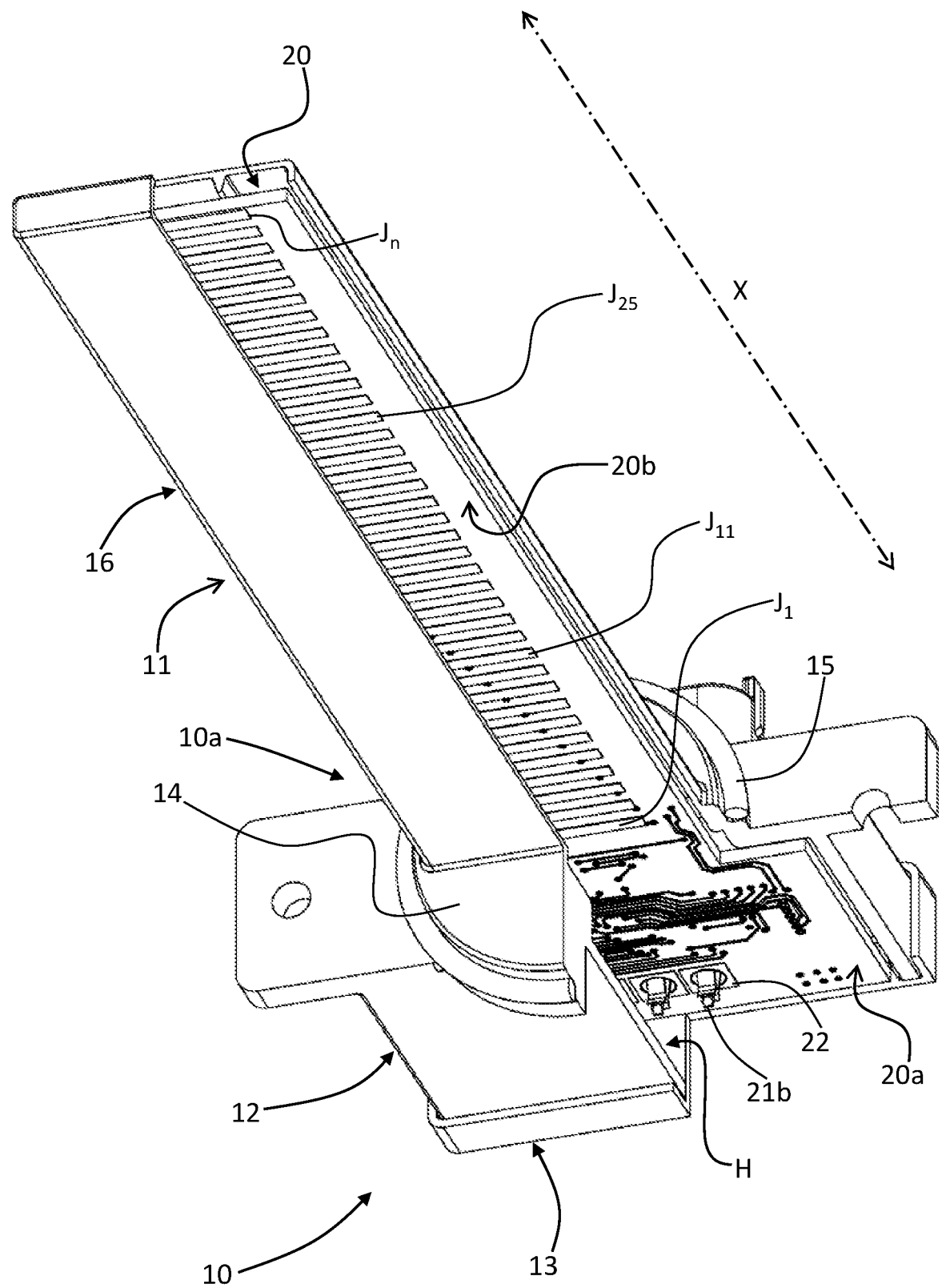
FIG. 5 is a partially sectioned schematic perspective view of a level-sensor device according to a possible embodiment of the invention.

In FIG. 5 a sensor 10 according to one embodiment is represented partially sectioned in order to highlight how its body 10*a* is hollow for housing the level-detection components. From the figure it may be noted in particular how the body 10*a* of the sensor defines, at the detection part 11, a hollow casing 16, having a generally elongated shape. In the example illustrated, the casing 16 has a generally prismatic, in particular substantially parallelepipedal, shape. More in general, the sensor 10 has at least one insulating layer, for electrically insulating its electrodes (described hereinafter) from the inside of the tank 1. In one embodiment, the body 10*a*, or at least its portion that is to be directly or indirectly exposed to the liquid (the casing 16 and possibly the attachment portion 14), is made of a mouldable thermoplastic material.

Once again in FIG. 5, it may be noted how housed in the cavity defined by the body of the sensor 10, designated as a whole by H, are the electrical and electronic detection components. In a preferred embodiment, these components are mounted on an electrically insulating substrate 20 that provides a circuit support. The support 20 is made of a material suitable for producing printed circuits, such as FR4 or a similar composite material like fibre-glass, or else ceramic material or polymer-based material, preferably a material that is mouldable for providing the support 20.

Identified in the circuit support 20 are a first portion 20a, which is to be received in the housing 12, and a second portion 20b, which is to be received in the casing 16. Inside the casing 16 there may also be provided a suitable gel, as described in WO2015/181770 A. Prevalently associated to the portion 20a of the support 20 are the electronic components for controlling the sensor 10, as well as corresponding terminals for external electrical connection of the sensor 10. Associated, instead, to the portion 20b of the support 20 are the detection components, including a series of electrodes. Some of these electrodes are designated by the letter J in FIG. 5 followed by the number that identifies the position of the electrode in the series that extends from the proximal end (electrode $J_1$) to the distal end (electrode $J_n$) of the detection part 11, i.e., of the portion 20b of the support 20.

In the example illustrated, a single circuit support is provided in which the parts 20a and 20b are defined, but in possible variant embodiments there may be envisaged a number of circuit supports connected together by means of suitable electrical-interconnection means and possibly mechanical-interconnection means (e.g., a circuit support corresponding to the portion 20a and a circuit support corresponding to the portion 20b, with electrical conductors or connectors for connecting electrically conductive paths of one portion to electrically conductive paths of the other portion).

Figure 6:
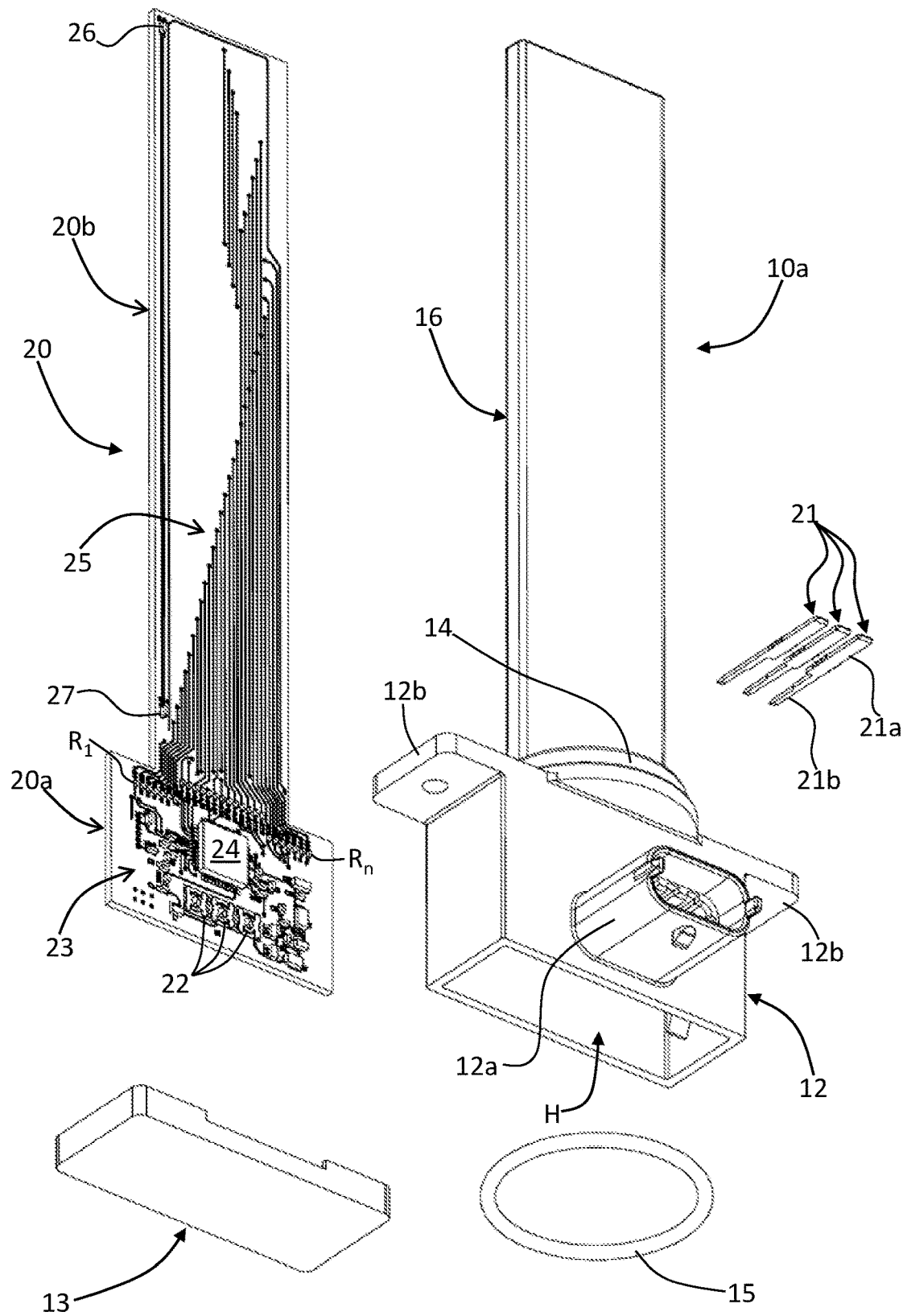
FIG. 6 is a partial exploded schematic view of a level-sensor device according to a possible embodiment of the invention.

In FIG. 6, a level sensor according to an embodiment of the invention is represented by means of an exploded view, from which there may be noted the various parts already identified above. Visible in this figure are the aforementioned terminals, designated by 21, preferably having a generally flattened shape, for example obtained via stamping and/or blanking from a metal strap, which provide, together with the connector body 12a fixed with respect to the housing 12, an interface for the external connection of the sensor 10, for example to a control unit of the SCR system on board the vehicle. In one embodiment, each terminal 21 has a lamina contact portion 21a, which is to be positioned within the cavity of the connector body 12a, and a narrow interconnection portion 21b, designed for electrical and mechanical coupling with respective contacts 22 present on the support 20, in particular in its portion 20a, described hereinafter.

Once again visible in FIG. 6 is the support 20 as a whole, with the corresponding parts 20a and 20b and the corresponding associated electrical and electronic components. The same support 20 is also represented in isolation in FIGS. 7 and 8, with opposite views of its major faces. The circuit support 20, having a generally elongated and preferably flattened shape, has associated to it on one of its major faces, here defined conventionally as "back", a control circuit arrangement, designated as a whole by 23, preferentially comprising an electronic controller 24, for example a microcontroller. The controller 24 preferably comprises at least one logic processing and/or control unit, a memory, and inputs and outputs, amongst which inputs of analog/digital type. The controller may, for example, be a microprocessor identified by the code PIC16F1517 manufactured by Microchip Technology Inc. or a microprocessor identified by the code CY8C24894-24LFXA or CY8C4245AXI manufactured by Cypress Semiconductor Corporation.

The components of the circuit arrangement 23 are connected to electrically conductive paths provided in the portion 20a, visible for example in FIG. 8, not indicated by reference numbers. On the back of the portion 20b of the support there is then provided a set of electrically conductive paths 25 for electrical connection of the electrodes J of FIG. 5 preferably with metallized holes for connection between paths on different surfaces and of possible other components to the arrangement 23.

The circuit comprises at least one temperature sensor, in particular provided on the corresponding circuit support 20, in particular a sensor of an NTC type. Such a sensor may be mounted at the at least one of the distal end region and the proximal end region of the portion 20b of the support 20. In the example represented, mounted on the portion 20b of the support 20, in particular on its back, are two temperature sensors 26 and 27, in opposite end regions of the portion 20b, connected to the circuit arrangement 23 via corresponding conductive paths. Assuming an installation of the sensor 10 in the tank 1 of the type illustrated in FIG. 2, the temperature sensor 27 can be used for detecting the temperature of the liquid, whilst the sensor 26 which in the mounted condition is located closer to the upper wall of the tank can be used for detecting the temperature that exists in the internal volume of the tank above the liquid, for example the temperature of the air. A configuration of the type represented, in particular with two temperature sensors 26 and 27, enables installation of the sensor 10 in the tank 1 both in the configuration of FIG. 1 and in the configuration of FIG. 2, for example by reversing at a software level the functions, and in particular the functions of the two sensors 26, 27 and the functions of the electrodes J. A temperature sensor may possibly be provided within the portion 20a of the support, i.e., within the housing 12.

In various embodiments, there are envisaged a number of temperature sensors along the development of the series of electrodes J, at least one of which in an intermediate position between the two end electrodes of the array itself, for the purposes described hereinafter.

In FIG. 8 the front of the support 20 is clearly visible, arranged in a portion 20b of which are the electrodes J, only some of which are indicated. In the non-limiting example represented, the electrodes J numbering 37 are arranged according to an array that extends in the lengthwise direction of the portion 20b of the support, i.e., along the detection axis X, set at a distance from one another in a predefined and preferably homogeneous way. The electrodes J are made of an electrically conductive material, for example a metal material or a metal alloy, and are associated to the front of the portion 20b of the support 20. The electrodes J are preferably coplanar with one another and may, for example, be in the form of plates or laminas impressed or applied on the support 20, or else constituted by an electrically conductive layer similar to the paths 25 deposited on the support 20, for example with a silk-screen technique or the like.

As has been mentioned, in one embodiment, the support 20 has three holes partially visible in FIGS. 7 and 8, one of which is designated by F containing conductive material for electrical connection between the electrodes J provided on the front of the portion 20b and the conductive paths 25 present on the back of the same portion of the support 20.

In various embodiments, the electrodes J are equal to each other and may, for example, be made with dimensions of 20 mm (length)×2 mm (height) and set at a distance of 2 mm from one another. For level sensors of less than 100 mm in length or in the case where it is desired to increase the resolution in an area of the sensitive portion of the sensor it is possible to reduce the size of the electrodes, and hence also reduce the distance between them, precisely to obtain a higher measuring resolution: in these cases, the electrodes may have, for example, dimensions of 15 mm (length)×1 mm (height) and may be set at 1 mm from one another. To maximize the dynamics of measurement with respect to the liquid, for example with respect to the liquid AdBlue considered herein (or some other solution with urea or a different reducing agent), it is moreover preferable to size the electrodes, for any value of their length, so that the height of one electrode is equal to the distance between two contiguous electrodes. Preferably, the spacing between two contiguous electrodes J will be greater than twice the thickness of the wall that separates them from the medium of which the level is to be detected. As will be seen, on the other hand, according to possible variant embodiments, the sensor 20 may envisage sets of electrodes of shapes and/or size different from one another.

As has been seen, in the embodiments so far mentioned, the level sensor 10 includes an array of capacitive elements $J_1$–$J_n$ ("n" being equal to 37, in the examples so far illustrated). In practice, each electrode J provides, together with the corresponding control electronics and preferably in combination with, or with reference to, at least one other electrode J, a sort of capacitive proximity sensor, capable of detecting the presence or absence of the medium even without a direct contact with the latter.

Operation of this sort is based upon the principle of detection of the capacitance of a capacitor: the two electrodes J constitute the sensitive sides of the capacitor, representing the plates thereof, and the medium that separates them represents the dielectric, thus giving rise to a substantially predefined capacitance (for the purposes of the invention, by the term "capacitance" is meant detection of a value of capacitance or of a capacitive impedance). The presence or absence of a further medium in the proximity of one of the two electrodes J determines a variation or perturbation of the aforesaid substantially predefined capacitance, which the control electronics is able to detect.

In the application considered herein, each electrode J is thus able to provide at least two different capacitive structures according to the presence or absence of the liquid in front of it, namely, at least:
 a first capacitive structure having a first value of capacitance, when an electrode J is facing the liquid, i.e., when the level of the liquid in the tank is in a position corresponding to or above the electrode J considered; and
 a second capacitive structure having a second value of capacitance, when an electrode J is not facing the liquid, i.e., when the level of the liquid in the tank is below the electrode J considered.

In the preferred embodiment illustrated, as has been seen, the electrodes J are insulated with respect to the liquid, in so far as they are contained in the electrically insulating and fluid-tight casing 16: the wall of the casing 16 that the electrodes J face, with the electrically insulating substrate or support 20 and/or the air and/or the possible gel, may hence be considered equivalent to a sort of dielectric.

Each electrode J is electrically connected preferably alone, but possibly also in parallel with at least one other electrode J to a respective input of a plurality of inputs of the controller 24 belonging to the circuit arrangement 23.

The controller 24 is substantially prearranged i.e., it comprises means for discriminating the value of capacitance associated to each electrode J at least between the aforesaid first and second values of capacitance and hence for identifying at least one liquid-air transition in the tank, which is indicative of the level of the medium. In a preferred embodiment, the controller 24 performs a sequential sampling of the values of capacitance present on the inputs to which the electrodes J are connected in order to identify the aforesaid transition.

The controller 24 is preferentially a digital microelectronic controller provided with memory means and/or an analog-to-digital converter. It should in any case be noted that the functions of the controller 24 and/or of the aforementioned memory may be at least in part implemented via dedicated external circuits. For example, in a preferred embodiment, the controller 24 is constituted by a microcontroller that implements at least one analog-to-digital converter module and/or memory means, but in other embodiments the controller 24 may include a microcontroller (or a microprocessor or an ASIC or FPGA integrated circuit) and at least one integrated circuit (either external or independent) dedicated to performing the functions of a memory, preferably of a rewritable type (e.g., FLASH or EEPROM), and/or of an analog-to-digital converter.

Figure 9:
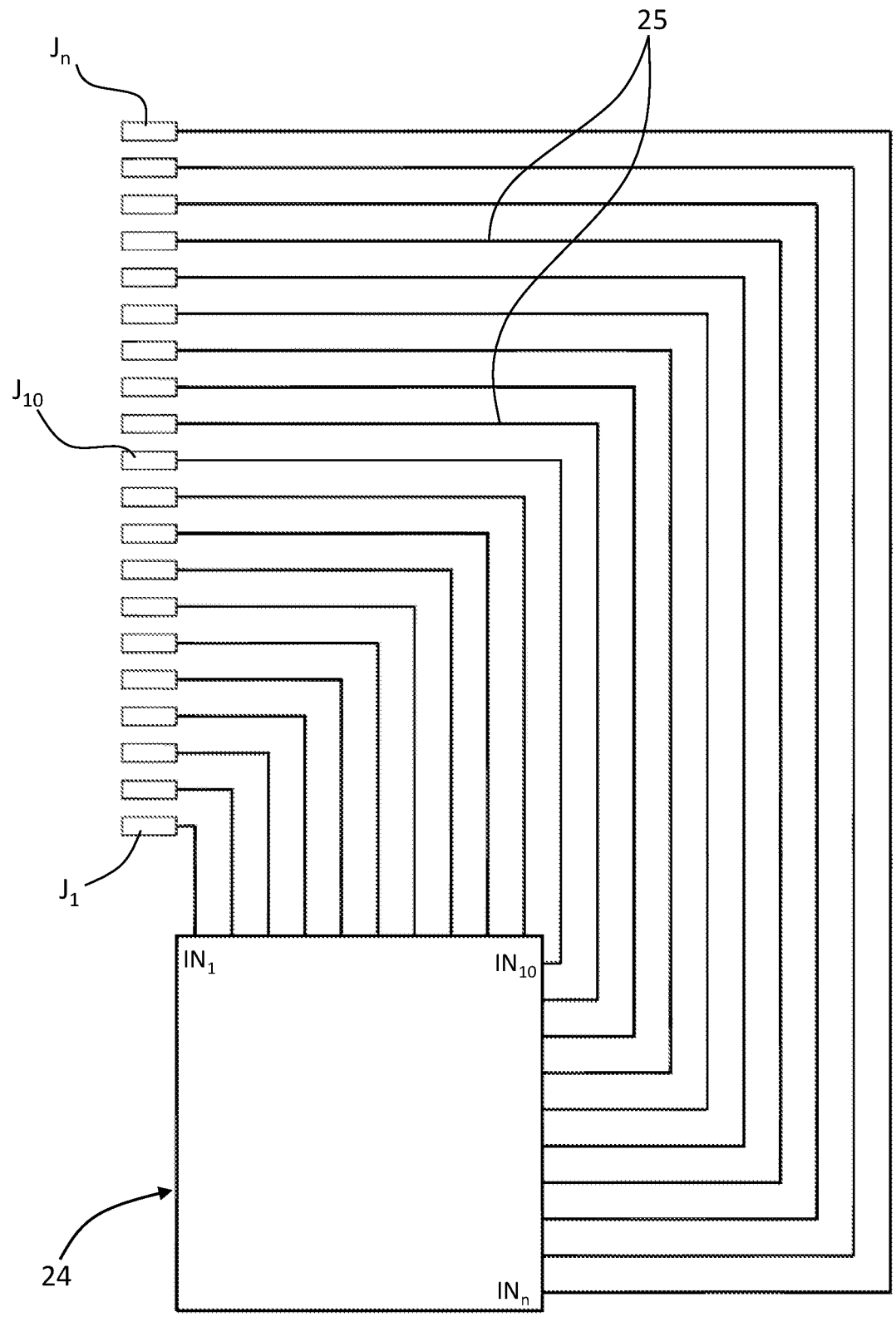
FIG. 9 is a partial and schematic representation aimed at illustrating a possible configuration of connection of electrodes of a level-sensor device according to a possible embodiment of the invention.

FIG. 9 is a schematic representation of a controller 24 that, merely by way of example, includes "n" signal inputs IN (here they number twenty), which are connected, via corresponding conductive paths 25, to as many electrodes J in single configuration (i.e., not connected in common or in parallel to other electrodes). FIG. 9 is aimed at clarifying the general operating principle of a sensor according to the invention.

In a preferred embodiment, detection of the value of capacitance on each of the inputs IN is made indirectly, for example on the basis of the measurement of a voltage or else by converting a capacitance at input to an equivalent resistance and then converting the current measured via the equivalent resistance into a digital count. In these cases, preferentially, the inputs IN of the controller 24 are analog inputs, and the controller implements or has associated to it an analog-to-digital converter. The aforesaid values are digitized within the controller 24 to take on the form of a pure number, or Raw Datum, following upon the quantization process.

In various embodiments, associated to each input IN is a sampling or measuring circuit including a controllable switch and a capacitor, here also defined as sampling switch and sampling capacitor. The controllable switch can be switched between a first position, where the sampling capacitor is connected to a voltage source, and a second position, where the capacitor is connected to a respective electrode J (or to a number of electrodes J connected in parallel). Preferentially, this voltage is a d.c. voltage, for example the supply voltage of the circuit arrangement 23. Preferably, the controller 24 comprises or has associated to it means for disconnecting electrically, or else connecting to ground, one or more of the inputs IN (i.e., the corresponding electrodes J) other than the one each time considered for the purposes of measurement, as well as means for causing switching the controllable switch from the first position to the second position so as to discharge the sampling capacitor in a way proportional to the value of capacitance associated to the corresponding electrode J (or series of electrodes J connected in common). In one implementation, there may be envisaged connection to ground of all the inputs IN (or electrodes J) other than the one each time considered for the purposes of measurement. In a possible variant embodiment, instead of a connection to ground, the input or inputs IN (i.e., the corresponding electrodes J) other than the one considered for measurement purposes may be connected to a different predefined electric potential, i.e., a different reference voltage, preferably a potential or voltage different from the voltage on the input IN or electrode J each time considered for the purposes of measurement of the capacitance (e.g., a voltage intermediate between the positive supply voltage and ground, or else a negative potential or voltage).

Furthermore, the controller 24 has means for determining the voltage on the input IN when the controllable switch is in its second position, this voltage being indicative of the capacitance associated to the electrode J (or to the series of electrodes J in parallel). The controller 24 then has control or comparators means, for comparing the voltage determined present on the input IN with at least one corresponding reference value or threshold, and thereby deducing whether the liquid is facing or not facing the electrode J (or else at least one of the electrodes of the series of electrodes J connected in common).

In one embodiment, scanning or sampling of the inputs IN is performed using a sample-and-hold circuit associated to an analog-to-digital converter, and the measurement of the capacitance of each electrode J (or series of electrodes J) is made as comparison of measurements with respect to the intrinsic capacitance of the circuit.

Figure 10:
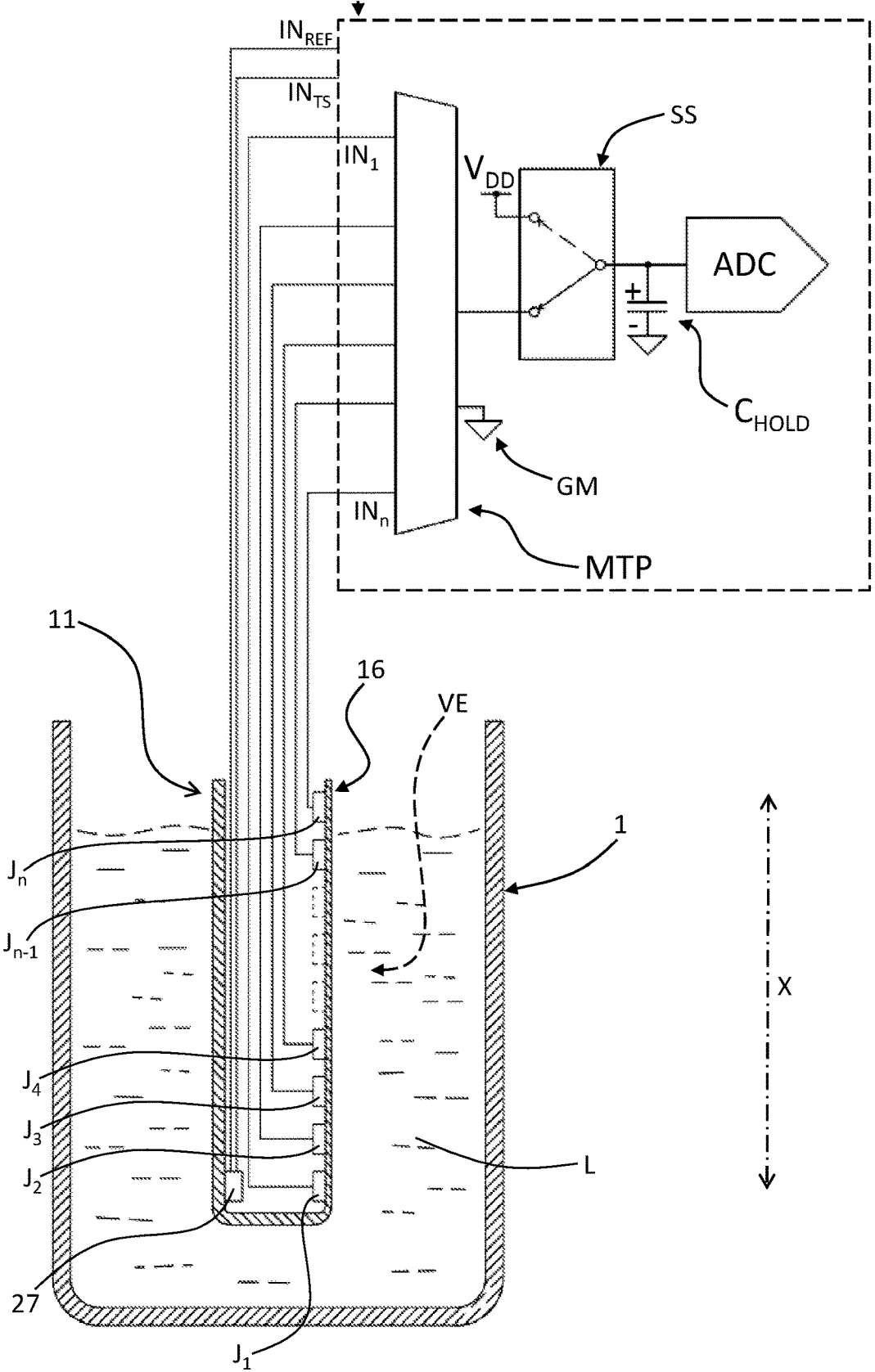
FIG. 10 is a partial and schematic representation aimed at exemplifying a possible circuit configuration of a level-sensor device according to FIG. 9.

An example of operation of a sensor according to the configuration of FIG. 9 i.e., with single electrodes connected to respective inputs of the controller 24 is illustrated schematically in FIG. 10. It should be noted that represented in this figure, merely for reasons of greater clarity, is a level sensor mounted from above, i.e., in the configuration of FIG. 1. The corresponding electrodes J, however, are illustrated in the same order as in FIG. 9 (hence with the electrode $J_1$ at the bottom and the electrode $J_n$ at the top). Also in the configuration of FIG. 10 at least one temperature sensor is provided, here the temperature sensor 27 positioned at the electrode $J_1$ located in the lowest position, connected to at least one corresponding input $IN_{TS}$ of the controller 24. In the example, the sensor 27 is also connected to a suitable reference input or node $IN_{REF}$.

Visible in FIG. 10 is the tank 1, inside which is the detection part 11 of the sensor, i.e., the electrodes $J_1$–$J_n$ contained in the corresponding casing 16 that is at least partially immersed in the liquid, designated by L (the support 20 is not represented here for greater clarity, and considering that, in a possible embodiment, the casing 16 itself could perform the functions of the support 20). In the example illustrated, the analog inputs IN of the controller 24 are only connected to multiplexer means, here represented by a multiplexer MTP preferably implemented in the controller itself, which substantially operates as an electronic multi-way switch, associated to which is a sample-and-hold circuit, for example comprising a holding capacitor $C_{HOLD}$ and a sampling switch SS. The switch SS can be switched between a first position, for connection to the voltage $V_{DD}$ (e.g., the supply voltage of the controller 24) and a second position, for connection to an output of the multiplexer MTP, i.e., a position for connection to the electrodes J.

As has been said, the control circuit arrangement 23 or its controller 24 may comprise means for connecting to ground one or more inputs IN, i.e., the corresponding electrodes J, other than the one each time connected to the sample-and-hold circuit. In the case of FIG. 10 for example, the multiplexer MTP is built so as to switch each time each input IN to the sample-and-hold circuit and one or more of the other inputs IN (possibly all of them) to ground, as represented schematically by the symbol of ground GM shown in FIG. 10. As has been mentioned, instead of a connection to ground, there may be envisaged opening of the connection or there may be envisaged a connection to a different predefined electric potential (in this perspective, the symbol GM may be understood also as representing a connection to the aforesaid predefined electric potential).

Via the multiplexer MTP the inputs IN, and hence the electrodes J, are sequentially connected to the switch SS. As has been said, when each of the inputs IN is connected by the multiplexer MTP to the switch SS, the multiplexer also connects to ground or to a different predefined electric potential one or more of the other inputs IN, preferably at least the inputs IN corresponding to the electrodes J located adjacent to or in the proximity of the electrode J each time connected to the sampling circuit.

The switch SS is switched cyclically, in a way synchronized with operation of the multiplexer MTP, between the first position, for charging the capacitor $C_{HOLD}$, and the second position, for connection of the capacitor itself to the input IN currently selected by the multiplexer MTP, and hence to the corresponding electrode J. With the switch SS in its second position there is basically determined a charge balance between the capacitance of the capacitor $C_{HOLD}$ and the capacitance associated to the electrode J considered, which here is assumed as being the electrode $J_1$. In other words, with this charge balance, the capacitor $C_{HOLD}$ is discharged in a way proportional to the capacitance of the capacitor defined by the electrode $J_1$ and by the electrode $J_2$ that is adjacent to the electrode $J_1$ and is connected to ground or to the aforesaid different predefined electric potential (it should be considered that, for the purposes of the aforesaid detection or discharge, also other adjacent electrodes J could contribute, such as the electrode $J_3$ represented if it is connected to ground or to a different predefined potential, but in a negligible way and hence not considered herein, for the purposes of a simpler and clearer explanation of operation of the system). Via the A/D converter there is then determined the amount of charge, i.e., a residual voltage, of the capacitor $C_{HOLD}$. A datum (Raw Datum) representing this charge is then compared with a predefined reference value or threshold in order to deduce whether the electrode $J_1$ considered is facing the liquid L or not, i.e., whether the electrode $J_1$ has assumed the first capacitive structure or configuration or the second capacitive structure or configuration referred to previously.

As explained above, when at least one pair of electrodes J is facing the liquid L, i.e., when the detection electrode J and at least one electrode J at ground or at a different electric potential are facing the liquid (e.g., the electrodes $J_1$ and $J_2$ of FIG. 10), associated thereto is a first value of capacitance, whereas in the opposite case (as for the electrodes $J_{n-1}$ and $J_n$ of FIG. 10) associated thereto is a second value of capacitance, different from the first value.

Following upon the aforesaid balance between the charges of the capacitor $C_{HOLD}$ and of the electrode $J_1$, the Raw Datum representing the voltage value across the capacitor and/or the input $IN_1$ may substantially coincide with or else be higher or lower than a given reference threshold, previously stored in the controller 24. For example, in one embodiment, the controller 24 may be programmed so that detection at an input IN of a voltage or Raw Datum equal to, or higher than, the predefined threshold is indicative of the fact that the electrode considered is facing the liquid L (as in the case of the electrode $J_1$), whereas detection at the input IN of a voltage or Raw Datum below the threshold is indicative of the fact that the electrode is not facing the liquid (as in the case of the electrode $J_{n-1}$).

As may be appreciated, by performing the sequential sampling described, the controller 24 is capable of identifying the two electrodes J corresponding to the liquid-air transition in the tank 1. Once the presence of the liquid-air transition has been detected, the controller can deduce the level of the liquid on the basis of the fact that the electrode of the two electrodes J associated to which is the voltage value lower than the threshold is the first one in air (or conversely, the electrode associated to which is the voltage value equal to or higher than the threshold is the last one facing the fluid). For this purpose, in the memory means and/or in the program or software that equips the controller 24 there is preferentially stored or predefined information representing values in length (height) corresponding to the position of each electrode J, or in any case of the distance between the electrodes J in the direction of the measuring axis X, so that it is possible to establish or calculate the level with the predefined measuring unit. The electronics of the sensor 10 transmits or generates signals towards the outside, in particular via its electrical connector, representing the level information and possibly information on the state of each electrode (such as a state in air or in liquid) and/or the values detected by each electrode and/or values associated thereto.

It will be appreciated that the operation described with reference to FIG. 10 can be performed also with circuits that are different but technically equivalent to the one exemplified. For example, to each input IN of the controller 24 there could be associated a respective circuit performing the functions of the sample-and-hold circuit described above, with a multiplexer MTP between the aforesaid circuit and the A/D converter. Another possibility is to provide each input IN with a sampling or measuring circuit, which, for example, performs the functions of the sample-and-hold circuit described above, directly interfaced with an A/D converter.

The capacitance depends in a non-linear way upon the temperature and, for this reason, each individual electrode J should be ideally compensated in temperature. To carry out such a compensation it would, however, be necessary to know for each individual electrode J the effective real temperature, i.e., to provide a temperature sensor in the proximity of each individual electrode J.

Given that the provision of multiple temperature sensors in a number corresponding to the number "n" of the electrodes would entail a non-negligible increase in cost and dimensions of the device 10, according to an aspect of the invention, the temperature compensation of a given electrode, referred to herein generically as electrode $J_x$, is made on the basis of the information that can be deduced from the electrode $J_{x-1}$, i.e., the electrode immediately below the one considered. In other words, according to this aspect, the previous electrode of the series ($J_{x-1}$) fulfils in practice the function of "virtual temperature sensor" for the next electrode of the series ($J_x$), considering the fact that since the two electrodes in question are relatively close to one another (roughly 1-2 mm)—the difference in temperature between them cannot be high.

In this way, according to this inventive aspect, the number of temperature sensors envisaged for the sensor 10 may be much smaller than the number "n" of the electrodes J, and possibly be limited to just one temperature sensor.

In various embodiments just one temperature sensor is used, such as the sensor 27, which is basically set in a position corresponding to the lower electrode of the array, here represented by the electrode $J_1$. This solution may be conveniently adopted when all the electrodes J are the same as one another, i.e., have the same size, and preferably are arranged all at the same distance apart or in any case at a known distance apart from one another.

The reason for this is that the method of calculation described hereinafter is designed to eliminate all the causes of drift and/or common-mode error (temperature, ageing, change in physical characteristics of the fluid such as permittivity and electrical conductivity, etc.), and for this reason can be preferably applied to arrays of electrodes that have the same geometry in terms of size and shape.

As will be seen, in other embodiments, in which a number of sets of electrodes are used that have different shapes and/or size and/or are set at different distances apart, the number of temperature sensors used is preferably equal to the number of discontinuities in the geometry of the electrodes and/or in their distances, as exemplified hereinafter. On the other hand, in the case where it is not possible (e.g., for lack of space available) to provide a number of temperature sensors corresponding to the number of discontinuities (preferably providing one temperature sensor at each discontinuity), it is possible to define an appropriate variation or offset of the value for each discontinuity in the calibration stage.

Figure 11:
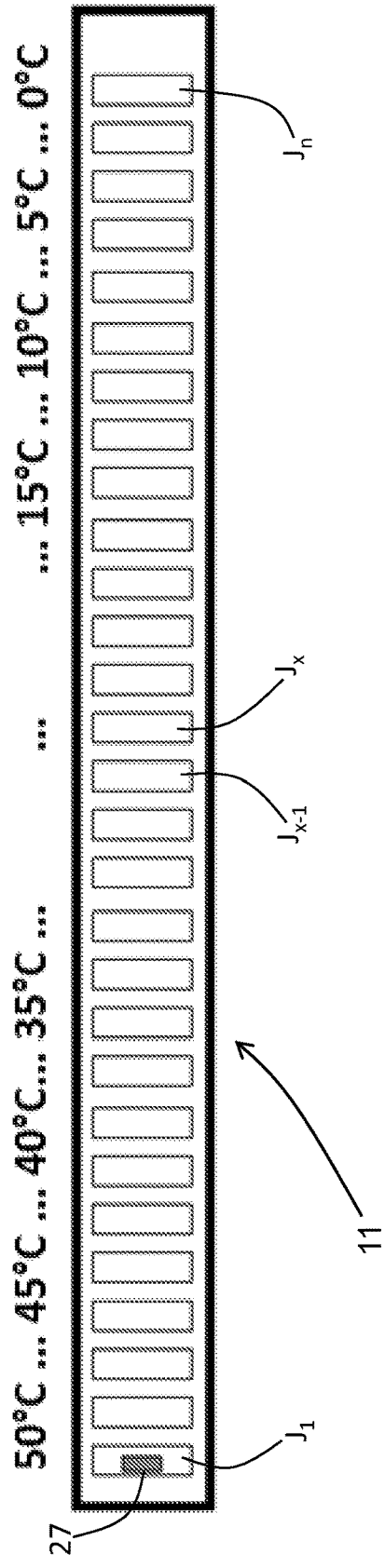
FIG. 11 is a schematic representation of a detection part of a sensor according to an embodiment of the invention.

FIG. 11 exemplifies the case of a detection part 11 with a series of electrodes J associated to which is just one temperature sensor 27, set at the first electrode $J_1$ (i.e., the lowest one).

During use of the sensor 10, the signal detected by means of each individual electrode J—as described above—is digitized within the controller 24 and assumes the form of a pure number following upon the quantization process. This signal, as indicated previously, is here referred to as "Raw Datum". This Raw Datum will have—at a given temperature in the proximity of the electrode considered—a first well-defined value when the electrode itself is located in air, and a second equally well-defined value, that is, however, very different from the first, when the electrode is located in the liquid.

During the stage of calibration of the device, the mathematics implemented within the controller 24, through the procedure explained above, hence associates two well-defined values for each electrode, according to whether the latter is in air or in liquid. In a typical implementation, for example at the temperature of 25° C. at the electrode $J_1$, we will have, for example:

| | |
|---|---|
| electrode in air | Raw Datum = 0 |
| electrode in liquid | Raw Datum = 10000 |

In the event of temperature variation at the electrode $J_1$, the physical characteristics of the sensor 10 vary, and the effect on the measurement is represented by a shift of the Raw Data for the various electrodes J. For example, FIG. 12 highlights the situations that occur in three different conditions of temperature (corresponding to −40° C., +25° C., and +85° C.) at the electrode $J_1$.

As may be noted, in the schematic example, the difference between the state in air and the state in liquid is always equal to 10000: however, the values of Raw Data are translated by −2000 at −40° C. and by +2000 at +85° C. In other words, the curve is translated towards the bottom of the graph at temperatures lower than 25° C. and translated towards the top of the graph at temperatures higher than 25° C. (it should be considered that, to facilitate understanding, in the schematic example the variations in temperature in the case of electrode in air and electrode in liquid have been indicated as being of the same value, i.e., with a quasi-linear variation: in practice, however, these variations may also be of a different value, varying in a non-linear way).

For a correct interpretation of the measurement, a temperature calibration hence becomes necessary that has the effect of maintaining the pre-established dynamics (e.g., the dynamics defined at 25° C.) for all the temperatures at which the sensor may be working, within its possible operating range. To obtain this it is necessary to have available information from at least one temperature sensor, and, as has been said, in a preferential configuration the temperature sensor 27 is hence provided at the first measuring electrode $J_1$ of the level sensor.

Having available the information on the temperature at which the electrode $J_1$ is working, thanks to the physical positioning of the temperature sensor 27 in the same area as the electrode $J_1$ (as close as possible, compatibly with the constructional constraints, for example, in a position corresponding to the electrode $J_1$ but on the opposite side of the support 20, as in FIGS. 7-8) it is possible to apply a mathematical compensation, on the basis of a calibration procedure that will be described hereinafter so as to obtain the same measurement dynamics for all the temperatures within the operating range.

It should be considered that, in the real application, it is possible for there to exist different temperatures along the measuring axis of the level sensor 10. Typically, the level sensor 10 is installed within a container that is filled with a liquid, and there may occur changes in ambient temperature. Consider, for example the case where the container is the tank of a motor vehicle that is moving from a warm place, such as a garage, to a cold place, such as the external environment in winter. Similar temperature variations may also be due to activation of a heating element set in the proximity of the container. Consider, for example the case where the container is a tank for a urea solution of an SCR system, installed at the bottom of which is a heater designed to unfreeze the liquid upon cold-starting of the motor vehicle (such as the one represented schematically and referred to by EH in FIG. 2). In these situations, there may be noted a temperature gradient all along the detection part 11 of the level sensor, where at one end for example, the bottom of the tank 1 close to the heater EH—there will be a certain temperature (e.g., 50° C., as represented schematically in FIG. 11), whereas at the other end—for example, an upper area of the tank, which may be colder, or the contents of which may be frozen there will be a very different temperature (e.g., 0° C., as represented schematically in FIG. 11), and along the detection part 11 the fluid present in the container will produce a temperature gradient (the temperature of the fluid varies from the aforesaid 50° C. in the bottom part to 0° C. in the upper part, in the example of FIG. 11).

The effect of this temperature gradient is that of distributing a major difference in temperature existing between the ends of the level sensor into a minor difference in temperature localized in certain points of the sensor; namely, between one electrode $J_x$ and the next electrode $J_{x-1}$ the difference will be of just a few degrees. This minor difference in temperature between the two contiguous electrodes leads to a minimal effect on the measurement of the dynamics between the two electrodes, and is hence negligible as compared to the case where the temperature sensor is used as reference for all the electrodes.

Considering electrodes J that have dimensions and geometries identical to one another, and hence the same behaviour in temperature, it is possible to configure a temperature compensation for the electrodes subsequent to the first electrode $J_1$, for which the physical measurement furnished by the temperature sensor 27 is available. In other words, the previous electrode ($J_{x-1}$) of the series may be used as temperature reference and/or as temperature-compensated value for the next electrode ($J_x$).

A possible methodology of temperature compensation of this type is the following:

i) the value of Raw Datum "$P_1$" for the electrode $J_1$ is measured;

ii) the effective temperature at the electrode $J_1$ is measured using the temperature sensor 27 positioned in the same area as the electrode $J_1$;

iii) a compensation mathematics is applied using the measurements of the sensor 27 and of the electrode $J_1$, to obtain a Raw Datum "$P_1$ Comp" for the electrode $J_1$, which is compensated in temperature;

iv) the value of Raw Datum "$P_2$" for the electrode $J_2$ is measured;

v) the difference "$D_2$" is calculated between the measurement of the Raw Datum "$P_2$" not compensated in temperature of the electrode $J_2$ and the measurement of the non-compensated Raw Datum "$P_1$" of the electrode $J_1$, i.e., $D_2 = P_2 - P_1$; hence, generalizing, $D_x = P_x - P_{x-1}$, where x can assume a value comprised between 2 (electrode $J_2$) and n (the last detection electrode $J_n$ of the sensor 10).

The availability of the datum $P_1$ Comp enables the controller to assign the state in air or in liquid to the electrode $J_1$, considering the corresponding threshold stored. For a generic electrode $J_x$, considering the generic threshold $T_x$ stored, it is possible to carry out assignment of the state in air or in liquid as indicated above, i.e.:

if $D_x$ is greater than or equal to $T_x$, then the electrode $J_x$ is in the same state as the electrode $J_{x-1}$ (whether in air or in liquid); and if $D_x$ is lower than $T_x$, then the electrode $J_x$ is in the state opposite to that of the electrode $J_{x-1}$ (if the electrode $J_{x-1}$ is in liquid, the electrode $J_x$ will be in air, and vice versa).

In some configurations, the value of the difference $D_x = (P_x - P_{x-1})$ can in turn be compensated in temperature using the value of the temperature sensor set in the area of the electrode $J_1$.

Another possible method is based upon execution, in the stage of initial calibration of the level sensor 20, of at least one measurement of the values of capacitance or impedance, i.e., of the corresponding Raw Data, for the various electrodes J, at a predefined temperature, for example +25° C. Preferably, these are measurements both in air and in contact with a liquid or substance corresponding to the fluid to be detected in the operating conditions. These values are stored in the memory of the controller 24.

After, in the course of actual operation of the sensor 20, the effective temperature at the electrode $J_1$ is detected, via the sensor 27, and the Raw Datum of the same electrode $J_1$ is measured at said effective temperature, for example 50° C. On the basis of these data, the controller 24 computes the difference between the Raw Datum for the effective measurement and the Raw Datum for the measurement made in the calibration stage. On the basis of this difference, which is linked at least in part to the different temperature existing in the two detection conditions, the controller 24 is able to define a variation and compensation coefficient $CX_1$.

To provide a specific example, if in the calibration stage a value "100" (at +25° C.) has been detected and stored, and in effective use of the sensor 10 a value "200" (at 50° C.) is detected, it may be established that the correlation coefficient is "2", calculation of the coefficient possibly consisting, for example, in a simple ratio between the two measurements (200/100=2). It should be considered that the present numeric example is simplified with integers purely for simplicity.

At this point, the sensor 20 performs the effective measurement via the next electrode $J_2$, then comparing it with the corresponding value stored in the calibration stage multiplied by the coefficient 2 computed previously. It is obviously assumed that the two close electrodes $J_1$ and $J_2$ are substantially at the same temperature of 50° C., except in the case a significant temperature gradient between the two electrodes. For example, it is assumed that in the calibration stage also for the electrode $J_2$ a value "100" (at +25° C.) has been detected and stored. This value is multiplied by the coefficient "2" to obtain a theoretical value "200". If, instead, the real effective measurement is "210", there is a difference of "10" with respect to the compensated theoretical value "200". This difference may be put down to various factors, amongst which also a different temperature from that of the electrode $J_1$, for example corresponding to a temperature variation (delta) of 0.1° C.

The effective value of the second electrode $J_2$ can hence be compensated by taking into account the aforesaid difference and recalculating a new coefficient $CX_2$ (e.g. 210/100=2.1), which will be used for the subsequent measurement of the electrode $J_3$, repeating the same procedure described previously, and so on for each further electrode up to the electrode $J_n$.

To be more certain that the aforesaid variations with respect to the theoretical value are due to different temperatures (and not, for example, to different substances in suspension, or to dirt on some electrodes, or the like) all these variations of measurement can be evaluated as a whole, for example to verify whether they correspond to a curve the trend of which is significant or else can be correlated to a temperature distribution along the sensor or a significant temperature gradient. The trend of such a curve can be considered significant for detecting a distribution of the temperatures also considering other factors, i.e., other measurements made or information available to the electronic control circuit.

Figure 12:
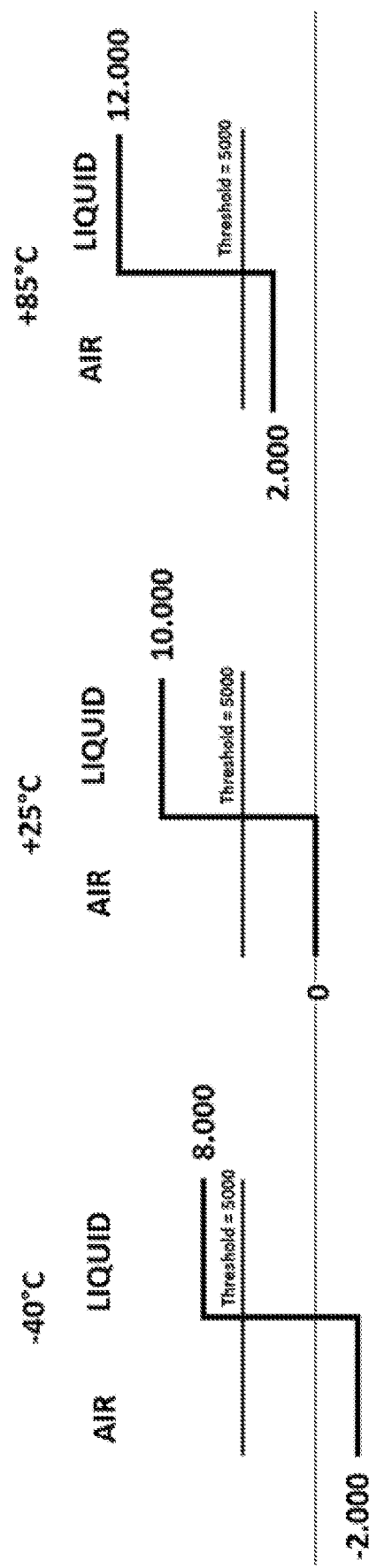
FIG. 12 is a graphic representation aimed at exemplifying the effect of a temperature variation on the dynamics of detection of an electrode of a known capacitive level-sensor device.

FIG. 12 exemplifies the case of an intermediate threshold T, defined at 5000 for the curve between 0 and 10000 at 25° C. in order to enable the electronics to discriminate between the two possible states of an electrode, i.e., in air or in liquid.

The variation expressed by the graph of FIG. 12 (shift of −2000 at −40° C. and +2000 at +85° C.) determines possible drawbacks in the case of use of fixed thresholds T, such as the aforesaid threshold at 5000, in so far as evidently the threshold is no longer centred: there is thus a reduction in the dynamics (useful area) for enabling discrimination between the two states of the electrode $J_x$ considered, and the detection is more affected by disturbance or cases in which a considerable difference is present between the values (as in real situations, where at the different temperatures the aforesaid difference provided by way of example of 10000 in the Raw Datum does not remain constant).

According to an inventive aspect, in order to prevent the above drawbacks, compensation methods are envisaged that make it possible to have a threshold as centred as possible with respect to the extremes of the diagram (i.e., the extremes of the raw data in air and liquid).

Figure 13:
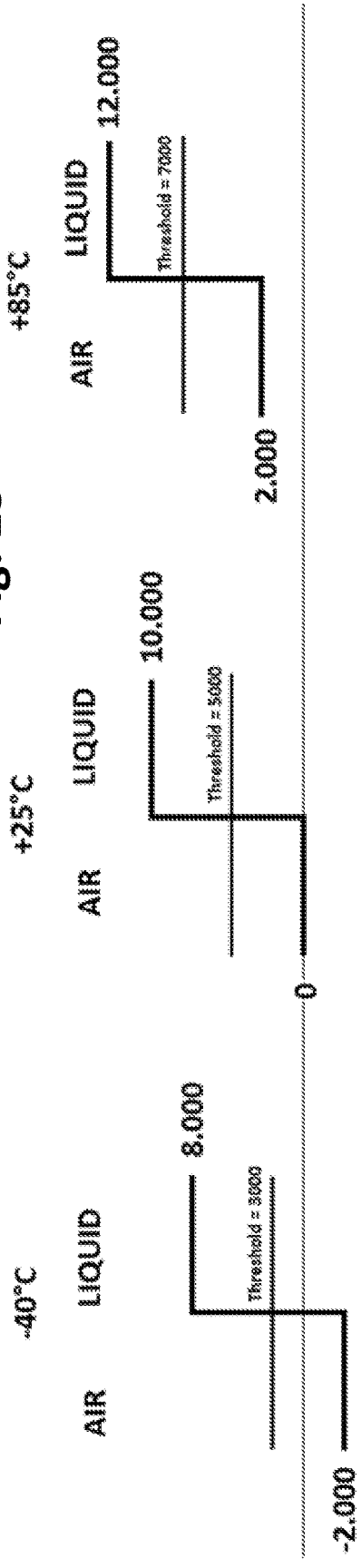
FIG. 13 is a graphic representation similar to that of FIG. 12, aimed at exemplifying a first compensation method used in a level-sensor device according to an embodiment of the invention.

According to a preferential embodiment, centring of the thresholds may be obtained by shifting the thresholds themselves as a function of temperature, in particular on the basis of the temperature value that can be obtained via the sensor 27. The graphs of FIG. 13 show the final effect of this type of compensation. The Raw Datum will vary its dynamics as a function of temperature, and the compensation algorithm will update the value of the threshold corresponding to that Raw Datum to maintain the value of the threshold centred in the entire dynamics of the Raw Datum. By so doing, the safety margin of the threshold with respect to the two values assumed by the electrode (in air and in liquid) remains symmetrical and constant, thus guaranteeing good operation of the sensor within the operating range.

This compensation method can be executed by the controller 24 as follows:

i) the value of Raw Datum "$P_1$" for the electrode $J_1$ is measured;

ii) the effective temperature at the electrode $J_1$ is measured using the temperature sensor 27 positioned in the same area as the electrode $J_1$;

iii) a compensation mathematics is applied using the measurements of the sensor 27 and of the electrode $J_1$, to obtain a Raw Datum "$P_1$ Comp" for the electrode $J_1$, which will thus be compensated in temperature;

iv) the value of Raw Datum "$P_2$" for the electrode $J_2$ is measured;

v) the difference "$D_2$" is calculated between the measurement of the Raw Datum "$P_2$" not compensated in temperature of the electrode $J_2$ and the measurement of the non-compensated Raw Datum $P_1$ of the electrode $J_1$, i.e., $D_2 = P_2 - P_1$; thus, generalizing, $D_x = P_x - P_{x-1}$, where x can assume a value comprised between 2 (electrode $J_2$) and n (the last detection electrode $J_n$ of the sensor 10);

vi) the difference "$D_1$" between $P_1$ Comp and $P_1$ is calculated, i.e., $D_1 = P_1$ Comp$-P_1$;

vii) the compensated threshold "$T_1$ Comp" for the electrode $J_1$ is calculated as algebraic sum of its nominal threshold "$T_1$" (stored in the manufacturing stage for the electrode $J_1$) and half of the difference $D_1$ referred to in step vi), i.e., $D_1/2$; this threshold will be used for discrimination of the state in air or in liquid of the electrode $J_1$;

viii) the compensated threshold "$T_2$ Comp" of the electrode $J_2$ is calculated as algebraic sum of its nominal threshold "$T_2$" (stored in the manufacturing stage for the electrode $J_2$) and half of the difference $D_2$ (generalizing, $D_x$) referred to in step v), i.e., $D_2/2$; this threshold will be used for discrimination of the state in air or in liquid of the electrode $J_2$;

ix) the same procedure referred to in steps vii) and viii) is used to obtain all the temperature-compensated values of the thresholds T of the electrodes $J_3, \ldots, J_n$ of the sensor 10, i.e., $T_x$ Comp$= T_x + D_x/2$ with $D_x = P_x - P_{x-1}$.

Once these calculations have been made, the controller 24 is able to interpret correctly the measurement of the Raw Datum of each individual electrode J also in the presence of a temperature gradient along the detection part 11 of the sensor 10.

The algorithm exemplified above is referred to the case where the two electrodes $J_x$ and $J_{x-1}$ are both in air or both in liquid. In the case of different behaviour (hence in the case where $D_x$ is greater than the value of the threshold $T_x$), it will also be necessary to take into account an offset equal to the value in liquid of the electrode $J_x$.

It should be noted that the proposed methodology of shifting of the thresholds can be implemented also by means of mathematics different from the preferred one exemplified herein, in any case based upon the value of the difference $D_x$ (i.e., the difference between the non-compensated raw data $P_x$ and $P_{x-1}$ of $J_x$ and $J_{x-1}$) and/or upon the temperature information of the Raw Datum $J_{x-1}$ in air.

According to a different embodiment, centring of the thresholds T can be obtained by shifting the curves or the detection values as a function of the temperature, i.e., by compensating or varying the values of Raw Data assumed by the individual electrodes, and maintaining, instead, fixed the corresponding nominal thresholds defined in the manufacturing and/or calibration stage. For this purpose basically the offset due to the different temperature is calculated, and the curve is consequently shifted, i.e., the reference values for air and liquid are recalculated. Also in this case the method is based upon the information representing the temperature value that is acquired via the sensor 27.

Figure 14:
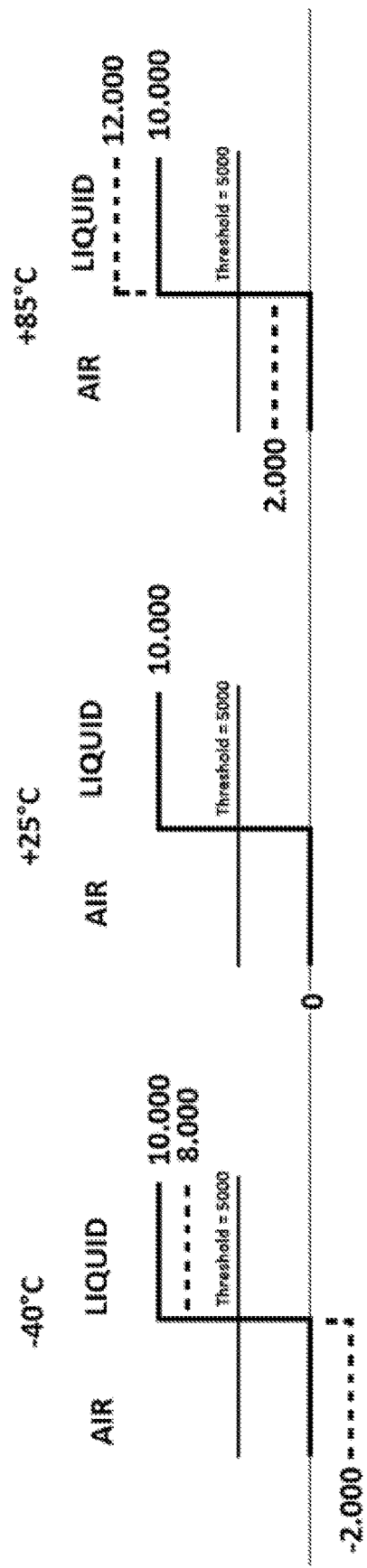
FIG. 14 is a graphic representation similar to that of FIG. 12, aimed at exemplifying a second compensation method used in a level-sensor device according to an embodiment of the invention.

In the graphs provided by way of example in FIG. 14 represented dashed are the curves that, in FIG. 12, had been defined as being offset following upon the variations in temperature: these curves are here "realigned" following upon the compensation methodology based upon shifting of the curves themselves so that the corresponding reference thresholds will be substantially centred.

This compensation method can be executed by the controller 24 as follows:

i) the value of Raw Datum "$P_1$" for the electrode $J_1$ is measured;

ii) the effective temperature at the electrode $J_1$ is measured using the temperature sensor 27 positioned in the same area as the electrode $J_1$;

iii) a compensation mathematics is applied using the measurements of the sensor 27 and of the electrode $J_1$, to obtain a Raw Datum "$P_1$ Comp" for the electrode $J_1$, which will be hence compensated in temperature;

iv) the value of Raw Datum "$P_2$" for the electrode $J_2$ is measured;

v) the difference "$D_2$" is calculated between the measurement of the Raw Datum "$P_2$" not compensated in temperature of the electrode $J_2$ and the measurement of the non-compensated Raw Datum $P_1$ of the electrode $J_1$, i.e., $D_2=P_2-P_1$; hence, generalizing, $D_x=P_x-P_{x-1}$, where x can assume a value comprised between 2 (electrode $J_2$) and n (the last detection electrode J of the sensor 10);

vi) to the difference $D_2$ calculated previously there is added the value of the temperature-compensated Raw Datum of the electrode $J_1$, i.e., $P_1$ Comp, to obtain a value "$P_2$ Comp" for the second electrode $J_2$ that in turn is temperature-compensated, i.e., $P_2$ Comp=$D_2$+$P_1$ Comp (thus, generalizing, $P_x$ Comp=$D_x$+$P_{x-1}$ Comp);

vii) the same procedure referred to in steps v) and vi) is followed to obtain all the temperature-compensated values of Raw Data of the electrodes $J_3 \ldots J_n$ of the sensor 10, i.e., $P_x$ Comp=$D_x$+$P_{x-1}$ Comp.

Once these calculations have been made, it is possible to interpret correctly the measurement of the Raw Datum of each individual electrode J, also in the presence of a temperature gradient along the detection part 11 of the sensor 10.

In a possible variant of the methodology just proposed, the calculation referred to in step vi) may envisage addition of the compensated value of the first electrode $J_1$, i.e., $P_1$ Comp, instead of the compensated value of the previous electrode, i.e., $P_{x-1}$ Comp: in this case, the mathematical formula becomes $P_x$ Comp=$D_x$+$P_1$ Comp.

A further variant of the method for centring the thresholds T based upon shifting of the curves envisages the same first five steps described above, whereas the generic formula that underlies the steps vi) and vii)

$P_x$Comp=$D_x$+$P_{x-1}$Comp is modified according to whether in the electrodes preceding the electrode $J_x$ there has not been detected a change in state (in air/in liquid) or else there has been detected such a change in state.

In particular, to the difference $D_x$ there is added the value of the temperature-compensated Raw Datum of the electrode $J_1$ ($P_1$ Comp) if the aforesaid change in state has not been detected, or else to the difference $D_x$ there is added the compensated value of the Raw Datum of the electrode $J_y$ ($P_y$ Comp) at which the air-liquid transition has been detected (where y is smaller than x, in so far as it corresponds to an electrode that precedes the electrode x). Thus generalizing:

in the absence of detection of an air-liquid transition below the electrode $J_x$, we will have $P_x$ Comp=$D_x$+$P_1$ Comp; and in the presence of detection of an air-liquid transition below the electrode $J_x$, we will have $P_x$ Comp=$D_x$+$P_y$ Comp, where y is the number of the electrode J corresponding to the position of the last air-liquid transition detected.

Hence, according to this variant, instead of adding always the value $P_1$ Comp to the value of the difference $D_x$, a check is made to verify occurrence of an air-liquid transition (or an opposite transition), in order to add to this difference $D_x$ the value of Raw Datum of the electrode corresponding to the last air-liquid transition (or an opposite transition). Hereinafter an example of implementation is provided, assuming that an air-liquid transition has been detected at the electrode $J_7$:

$P_2$Comp=$D_2$+$P_1$Comp($J_1$ and $J_2$ are in liquid, no transition)

$P_3$Comp=$D_3$+$P_1$Comp($J_2$ and $J_3$ are in liquid, no transition)

$P_4$Comp=$D_4$+$P_1$Comp($J_3$ and $J_4$ are in liquid, no transition)

$P_5$Comp=$D_5$+$P_1$Comp($J_4$ and $J_5$ are in liquid, no transition)

$P_6$Comp=$D_6$+$P_1$Comp($J_5$ and $J_6$ are in liquid, no transition)

$P_7$Comp=$D_7$+$P_1$Comp($J_7$ is in air, whereas $J_6$ is in liquid)

At the electrode $J_7$ there is hence a transition, and from this point on the calculation of the compensated values will no longer use $P_1$ Comp, but $P_7$ Comp, as follows:

$P_8$Comp=$D_8$+$P_7$ Comp($J_7$ and $J_8$ are in air, no transition)

$P_9$Comp=$D_9$+$P_7$ Comp($J_8$ and $J_9$ are in air, no transition)

$P_{10}$Comp=$D_{10}$+$P_7$ Comp($J_9$ and $J_{10}$ are in air, no transition)

$P_{11}$Comp=$D_{11}$+$P_7$ Comp($J_{10}$ is in air, whereas $J_{11}$ is in ice)

The transition that is detected between the electrodes $J_{10}$ and $J_{11}$ expresses the presence in the tank of the so-called "igloo effect", i.e., the presence of a layer of air overlaid by a layer of frozen liquid. After this new transition, the calculation of the compensated values will no longer use $P_7$ Comp, but $P_{11}$ Comp, as follows:

$P_{12}$ Comp=$D_{12}$+$P_{11}$ Comp($J_{11}$ and $J_{12}$ are in ice, no transition)

$P_{13}$ Comp=$D_{13}$+$P_{11}$ Comp($J_{12}$ and $J_{13}$ are in ice, no transition)

$P_{14}$ Comp=$D_{14}$+$P_{11}$ Comp($J_{13}$ and $J_{14}$ are in ice, no transition)

$P_{15}$ Comp=$D_{15}$+$P_{11}$ Comp($J_{14}$ and $J_{15}$ are in ice, no transition)

and so forth for all the other electrodes J present.

Also in this variant, once these calculations have been made, it is possible to interpret correctly the measurement of the raw datum of each individual electrode J, also in the presence of a temperature gradient along the detection part 11 of the sensor 10.

The steps iii) of the methods proposed previously envisage application of a generic mathematical function, designed to use the temperature information acquired via the sensor 27 and the information of the Raw Datum of the electrode $J_1$ in order to calculate the compensated Raw Datum $P_1$ Comp. This generic mathematical function may evidently be a function of a known type, for example a linear function, a second-degree polynomial function, a third-degree polynomial function, an exponential function, a cubic-spline function, a Bézier-curve function, an n-degree spline function. In order to achieve a good compromise between the accuracy required and the complexity of the software and of the on-line calibration procedure that it is desired to use, it is preferable to use at least a second-order approximation.

In some applications, there may be required a different tolerance for the level measurement, in different positions of the detection part 11 of the sensor. This leads, for example, to positioning electrodes of different geometry in terms of shape and size along the part 11 in order to guarantee the required measurement tolerance in that given area. This choice is moreover in some cases constrained by the need to minimize the cost of the controller 24, which is also linked to the number of electrodes that it is possible to manage. For this reason, in certain applications, it is preferred to increase the size of the electrodes in the areas where the maximum detection resolution is not necessary (typically at the two ends).

As explained previously, however, the mathematical calculation of temperature compensation is more reliable or precise only given the same size of the various electrodes and the same distance between them. The differential algorithm described previously is in fact no longer sufficient to guarantee proper temperature compensation of the raw data measured. Its operation is, in fact, based upon the fact that the two contiguous electrodes J undergo substantially the same effect if subjected to a temperature variation. As has been seen, however, for this to be true, it is necessary for the two electrodes to have the same size and shape.

If two contiguous electrodes have different geometry, in terms of size (hence the same shape but a different area), or else in terms of shape (hence the same surface area but a different shape), or else in terms both of size and of shape, the two electrodes in question will present a different behaviour if they are subjected to one and the same temperature variation. This represents a discontinuity in the differential method, which could lead to a non-correct temperature compensation.

To be able to determine proper operation of temperature compensation it is thus necessary to make sure that the geometrical discontinuities of the electrodes (where by "discontinuity" is meant the passage from an electrode having a defined shape and size to an adjacent electrode that has differs in at least one of the two characteristics) will not entail discontinuities in the differential calculation method. For this reason, it becomes necessary to measure the real temperature of the electrode that is discontinuous in size and/or shape with respect to the previous electrode.

Figure 15:
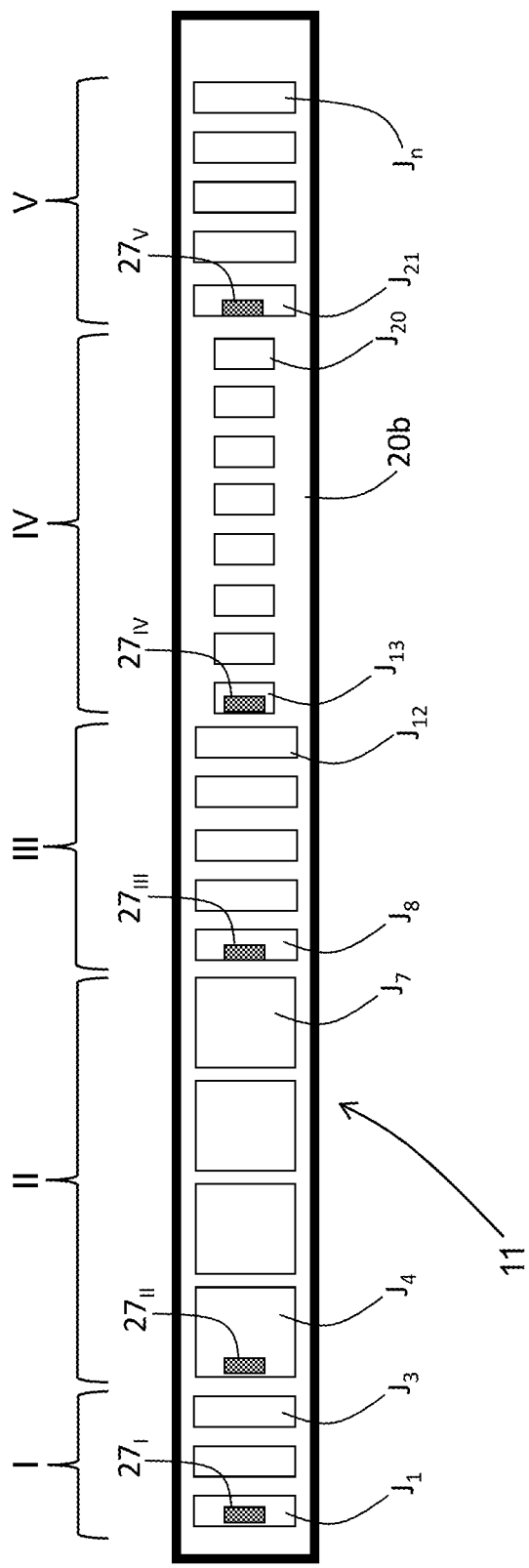
FIG. 15 is a schematic representation of a detection part of a sensor according to a further embodiment of the invention.
Figure 16:
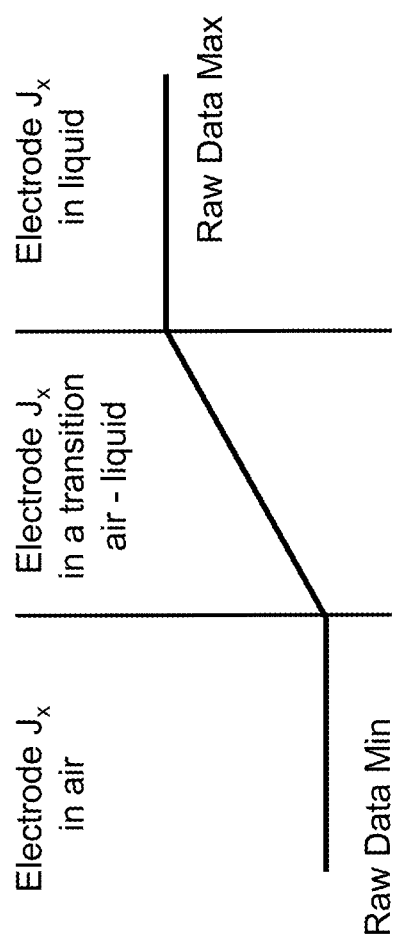
FIG. 16 is a schematic representation aimed at exemplifying the dynamics of detection of a detection electrode of a level-sensor device according to the invention.

Consequently, according to an embodiment in itself autonomously inventive, in the case of level sensors that use sets of electrodes having different shapes it is preferable to use a number of temperature sensors of the type designated previously by 27, preferably each located at the first electrode of each series. Such a case is schematically represented in FIG. 15, where the detection part 11 of the sensor includes a sequence of five different sets I, II, III, IV, and V of electrodes J, and where associated to the first electrode J of each series i.e., the first electrode of each series with reference to the electrode $J_1$ that is the lowest, in the mounted condition of the level sensor is a corresponding temperature sensor 27. In the example, the aforesaid first electrodes of each series are the electrodes $J_1$, $J_4$, $J_8$, $J_{13}$, and $J_{21}$, associated to which are, respectively, the temperature sensors referred to herein for convenience by $27_I$, $27_{II}$, $27_{III}$, $27_{IV}$, and $27_V$ (taking for granted that the sensor $27_I$ corresponds to the sensor designated by 27 in the previous figures). Also in an embodiment of this type, the various sensors 27 are basically mounted in the area of the electrodes $J_1$, $J_4$, $J_8$, $J_{13}$, and $J_{21}$, for example on the opposite side of the corresponding support 20 (see for reference FIGS. 7 and 8) and connected to respective inputs of the controller 24. The electrodes of each of the sets I-V are equal to each other and are preferably set at same mutual distance from each other. Preferably, the distances between the electrodes of the various sets are homogeneous (i.e., the distance between the electrodes of one series is equal to the distance between the electrodes of the other sets), as likewise homogeneous are the distances between the sets of electrodes (i.e., the distances between the last electrode of one series and the first electrode of the next series are the same for all the sets, and are preferably equal to the distance between the electrodes of each series). These distances referred to as preferential could, however, be also different, in this case it being possible to adopt predefined values for the appropriate compensations and/or calculations of the distance and/or measurement of the level.

As may be noted, according to this aspect, a temperature sensor 27 is then applied not only on the first electrode $J_1$, but also on the first electrode corresponding to each geometrical discontinuity between the electrodes $J_1$–$J_n$.

The calculation algorithm used by the controller 24 is the same as the one already described previously, but with the difference in this case the controller will proceed to reiterating this algorithm a number "r" of times, corresponding to the number of sensors 27, i.e., of sets of electrodes. During operation of the sensor 10, then, the controller 24 will execute the algorithm first for the electrodes of the series I, on the basis of the values measured via the electrode $J_1$ and the temperature sensor $27_I$, then will repeat it for the electrodes of the series II on the basis of the values measured by the electrode $J_4$ and the sensor $27_{II}$, and so forth for the remaining sets of electrodes. Of course, the controller 24 can use any of the two compensation methodologies described above for each series of electrodes (shifting of the thresholds or shifting of the curves).

As has been seen, the operating principle of the sensor 10 is based upon the continuous measurement of many discrete elements, i.e., the electrodes J, arranged along the length of the detection part 11. The number of these electrodes is defined according to the total length and to the resolution required by the application. Considering a single electrode $J_x$, during operation of the sensor 10, the corresponding Raw Datum may assume only a number of values defined within a certain range (Raw Datum Min–Raw Datum Max), which will be linked to the percentage of area of the electrode that is facing the liquid, as represented schematically in FIG. 11.

As has been said, in the operating conditions of the sensor 10, assignment of the state in air or else in liquid for a single electrode is based upon the comparison of the measurement of the Raw Datum acquired at each measurement cycle of the controller with a corresponding threshold T. If the numeric value of Raw Datum is less than the threshold value T, then the corresponding electrode is assigned the state in air; if, instead, the numeric value of Raw Datum is greater than or equal to the threshold value T, then the electrode is assigned the state in liquid.

In preferred embodiments, the value of the threshold $T_x$ assigned to each electrode $J_x$ can be defined on the basis of one of the methods described below.

a) Constant threshold—In this implementation, the value of the threshold T is a constant, which may differ from one electrode to another and is saved in the memory of the controller 24. This value T is defined on the basis of design analysis and on a representative number of samples. In general, it may be assumed that the threshold T is positioned exactly at half the dynamic range (Raw Datum Min–Raw Datum Max) so as to maximize the safety margin against disturbance both for the measurement in air and for the measurement in liquid. As has been said, in some cases, the initial calibration may be made both in air and in the measurement liquid or in a liquid with similar characteristics. In this case, the thresholds T for the electrodes can be defined during the calibration procedure so as to maximize, for example, the distance between the values of Raw Data in air and in liquid, for example via calculation of the threshold T as mean value (Raw Datum Min+Raw Datum Max)/2.

b) Dynamic threshold—In this implementation, the thresholds T are defined as in the previous case and saved to the memory of the controller 24. However, during operation of the sensor 10, the value of the threshold $T_x$ for an electrode $J_x$ is updated according to a precise method, aimed at cancelling out a possible effect of drift of the dynamics, for example as a result of ageing of some parts of the sensor 10 or of the measurement medium. The measuring dynamics for a single electrode $J_x$ is defined as the difference between the value of the Raw Datum of that electrode read in liquid and the value of the Raw Datum of the same electrode read in air:

Dynamics $J_x$=Raw Datum$_x$ in liquid–Raw Datum$_x$ in air

Thanks to the differential algorithm described above the sensor 10 manages to cancel out the common-mode effects and/or errors and preferably to obtain that the measurements of the various electrodes $J_1$-$J_n$ are always referenced with respect to one another.

This regards shifting of the dynamics of one electrode with respect to another, as in the case of the effect of the temperature described above. Another possible effect regards, however, modification of the amplitude of the dynamic range, which would affect the safety percentage, in so far as the threshold would no longer be positioned in the correct point (e.g., at 50% of the dynamic range).

The method of matching the value of the threshold implemented by the controller 24 is designed to compensate for this effect by modifying the aforesaid value on the basis of reading of the dynamics of at least one other electrode in liquid, for example the first electrode $J_1$ or the average of the electrodes preceding the electrode $J_x$ considered (i.e., the electrodes $J_1$ to $J_{x-1}$). Once the reference electrode (or a number of reference electrodes) has been selected, the method checks that this electrode is totally covered by the liquid (i.e., that the measurement of its Raw Datum corresponds to the maximum dynamics possible for that electrode: Raw Datum Max). At this point, the current dynamics is compared with the value of the threshold T saved in the memory and, if necessary, this threshold value is modified and updated.

In some cases, it is convenient to define thresholds $T_1, \ldots, T_n$ that are different from one another. In these cases, during calibration (e.g., in air), the threshold $T_x$ can be defined as $P_x/2$ (i.e., half of the value of the non-compensated measured Raw Datum).

In these cases, the compensation factor is calculated as Ci=$P_x$ (at the instant i)–$P_x$ (at the instant 1')/2, where by instant 1' is meant the previous instant closest to the instant i when the value of $P_x$ in liquid has been stored. The values of the thresholds T at the instant i are then corrected by adding the value of Ci.

As explained previously, the differential algorithm described above is used to obtain, for each electrode, the value of temperature-compensated Raw Datum ($P_x$ Comp). This value is compared with the respective threshold T defined previously. For each electrode 1 to 'n', as has been seen, the following definition applies:

if $P_x$ Comp <$T_x$, then the electrode x is in air; and
if $P_x$ Comp ≥$T_x$, then the electrode x is in liquid.

Once the state in air or in liquid has been assigned to each electrode and saved to the internal memory of the microcontroller 24, the measurement cycle is terminated, and the algorithm starts again to carry out a new measurement cycle. At this point, the datum present in the memory can be processed according to the specifications of the various systems in which the level sensor 10 is used to obtain that the datum transmitted on the outside of the sensor itself is correctly interpreted by the corresponding receiver system. In a preferred configuration, the level in millimetres is calculated, considering the sequence of active and contiguous electrodes.

Following upon the scan made, the controller 24 can identify two adjacent detection electrodes, of which one faces the liquid and the other does not, i.e., the position in height of the liquid-air transition in the tank 1.

In various embodiments, the electronics of the sensor forming the subject of the invention is appropriately initialized and/or calibrated in the manufacturing stage, with storage of the corresponding software and of data or parameters, for example storage of the measurement value of each individual electrode at at least one predefined temperature, preferably detecting the values of each individual electrode in at least one of the two conditions of absence and presence of liquid, in particular in air and in a liquid that corresponds or is designed to simulate the liquid to be detected in the operating conditions, such as a urea solution or a fuel.

Preferably, the controller 24 is programmed in the manufacturing stage with software defined in the design stage. Preferably, after programming, the controller 24 is reset or assumes an initial condition. Following upon reset, the controller 24 will start to carry out various operations envisaged by the software. In various embodiments, the controller 24 initially controls the status of its own internal memory (or of the possible non-volatile memory associated thereto), in the area that is to contain the various calibration parameters, such as the temperature-compensation coefficients and/or the thresholds necessary for discrimination of the state of the electrodes (in air or in liquid), as described hereinafter. From the status of the memory the controller 24 can distinguish whether the procedure to be carried out is the procedure of setting in the manufacturing stage (i.e., at first turning-on after programming), or else the normal operating procedure.

In the case where the aforesaid memory area is empty, the controller 24 proceeds with execution of least one calibration step, in dry conditions and/or in air. In this step, the controller 24 simulates at least one measurement cycle, as explained above with reference to FIG. 10, switching via the multiplexer MTP between all the electrodes $J_1$-$J_n$ present. The result of this reading is a value of Raw Datum for each electrode J: as has been said, this procedure may be made with the sensor device 10 in air, in which case the corresponding values regard each individual electrode in air.

In preferred embodiments, the controller 24 performs a filtering or a processing aimed at minimizing the effect of the disturbance or of the random noise present in the system where the level sensor is installed. For this purpose, preferably, the controller 24 issues a command for carrying out a certain number of readings on all the electrodes (e.g., a sixteen readings), and these readings are saved to memory. When the number of readings established has been carried out, the controller 24 applies a function on all the readings for each individual electrode J, in order to obtain just one value from all the ones read. As has been said, this filtering is aimed at minimizing the effect of noise. According to the system of installation envisaged for the device, and hence to the type of noise, it is possible to adopt the function deemed most suitable for choosing the value of the measurement considered most correct from among all the ones read. For example, the function may regard considering the average of the sixteen values detected, or else considering the minimum value, or else considering the maximum value.

Once for each electrode J the controller 24 has selected a single value of Raw Data in air, the corresponding values of all the electrodes are organized in an array, of a length equal to the total number of the electrodes, where each location of the array contains a single Raw Datum here defined as "in air", which is stored in an appropriate memory area.

At this point, a measurement cycle in liquid can be started, i.e., with the detection part 11 of the sensor 10 immersed, for example, in a sample of the liquid for which the sensor itself is provided in the practical application, for example a reducing agent, such as a urea solution.

For this purpose, the controller 24 manages its multiplexer MTP so as to connect all the inputs IN connected to the electrodes J, one at a time, to the signal-acquisition circuit, represented in FIG. 10 by the measurement circuit $V_{cc}$, SS, $C_{HOLE}$. The first step is to connect the input $IN_1$ connected to the first electrode $J_1$ to the measurement circuit and carry out the measurement to obtain a Raw Datum here defined "in liquid" corresponding to $J_1$; this value is saved to memory. Similar measurements are then carried out for each electrode, up to the electrode $J_n$.

Next, a mathematical calibration or processing of zeroing or "blank" can be carried out, aimed at bringing back the measurement into a known state. Subtracted from the value of each Raw Datum in liquid of each individual electrode saved to memory during the measurement cycle is the value of Raw Datum in air of the corresponding electrode saved to memory during the initial cycle. The result of this subtraction is assigned to the corresponding electrode and in turn saved to memory: these data are herein referred to as $V_1, \ldots, V_n$, (where the numbers 1 to "n" represent the references to the electrode), to be used in order to define the level measurement (hence, V=Raw Datum in liquid−Raw Datum in air).

This calibration has a dual purpose: the first is to determine the so-called blanking of the system, i.e., to calibrate all the electrodes so that the measurement of each electrode in the same known state, in particular in air, will yield the same number (in the case in point zero). In this way, all the differences between the measurements of different electrodes that are produced via the design and manufacturing process are set to zero, rendering the subsequent internal calculations for definition of the level more stable and secure. The second purpose is to optimize the use of memory of the controller 24 since, by applying the subtraction between two numbers that are potentially large in the calibration stage, a datum of smaller dimensions is obtained, which, however, is effectively the datum that contains the desired information, this datum using less space within the memory as compared to the original measurement.

Once again in the manufacturing stage, a calibration of the sensor 10 at different temperatures is then made, preferably using at least three different temperatures distributed within the operating range expected for the sensor itself. For simplicity, consider the three exemplifying temperatures of some graphs described hereinafter (FIGS. 12-14), i.e., −40° C., +25° C., and +85° C. In general, in any case, one temperature will be towards or equal to the lower limit of the range (cold), a second temperature will be at the centre of the range (e.g., the temperature of the manufacturing environment), and one temperature will be towards or equal to the upper limit (hot). The exact choice of the calibration temperature is affected by the type of mathematical function used within the controller 24 (linear, quadratic, cubic, etc.).

The temperature-calibration procedure consists in stabilizing the sensor 10, for example kept in air, at the various temperatures decided for the process, for example the three temperatures indicated above. When the sensor 10 is stabilized at a given temperature (e.g., at +25° C.) a measurement cycle is carried out, for example in air and/or in liquid, i.e., a scanning and reading of the Raw Data for all the electrodes J, and the result is saved to the memory of the controller 24 (according to a possible variant, this information can be saved by the production equipment, which computes the coefficients of the compensation curve, which will be then saved within the memory of the controller 24). Once the necessary data have been acquired at the defined temperatures, the controller 24 computes the coefficients of the function chosen for temperature compensation, for application of a differential algorithm in normal use of the device, as described hereinafter.

Figure 17:
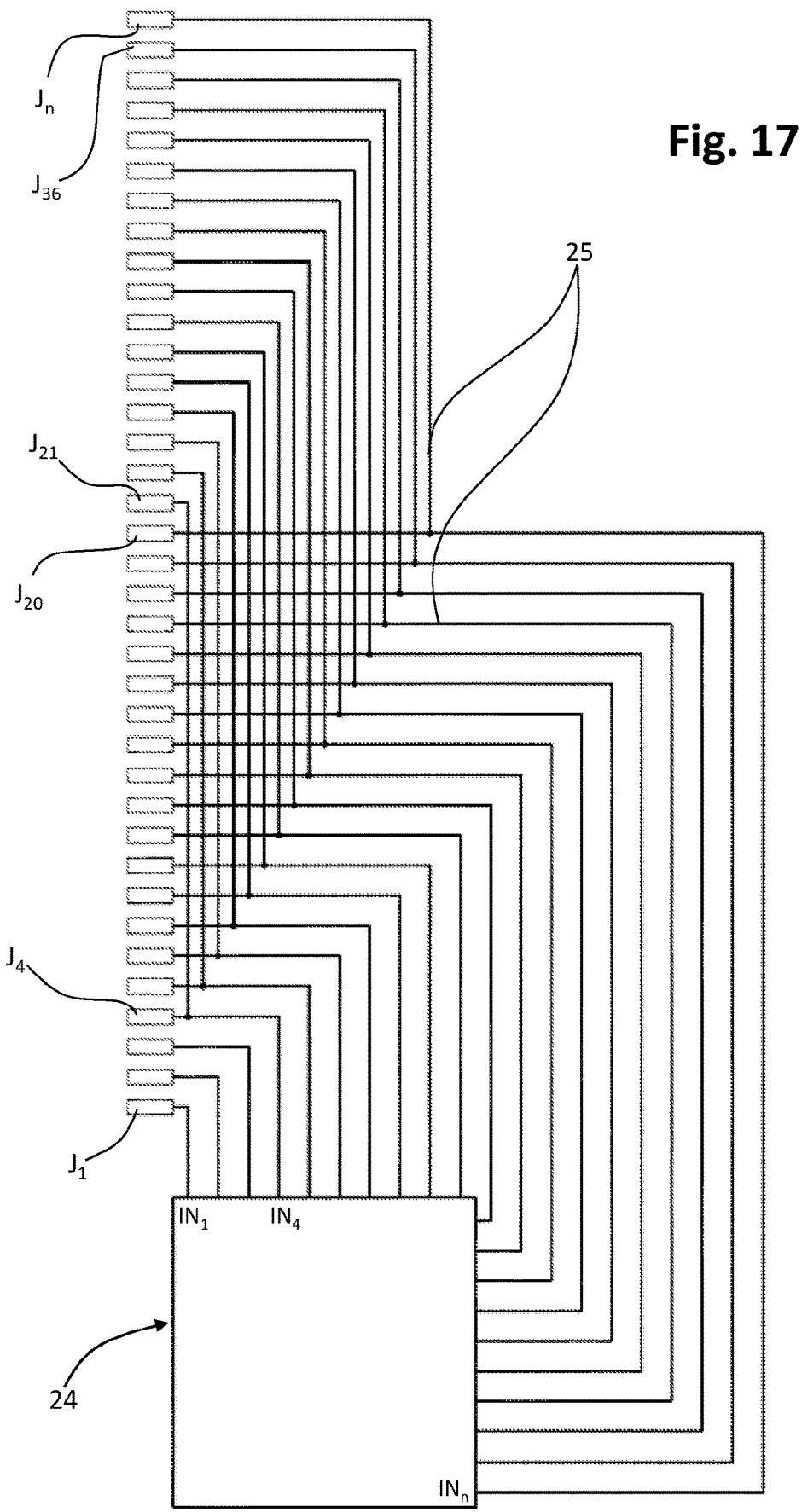
FIG. 17 is a schematic representation aimed at illustrating a further possible configuration of connection of electrodes of level sensors according to possible alternative embodiments of the invention.

As has been mentioned, in possible embodiments, the detection electrodes comprise at least first detection electrodes, connected to respective inputs IN of the controller 24, and second detection electrodes, which are electrically connected in common or in parallel to the first detection electrodes. An example of this type is illustrated schematically in FIG. 17, where the aforesaid first electrodes go from the electrode $J_4$ to the electrode $J_{20}$, whereas the second electrodes go from the electrode $J_{21}$ to the electrode $J_n$. In this example, the electrodes $J_1$-$J_3$ may be reference electrodes. In the configuration of FIG. 17, it is basically possible to identify a first sub-array (or module or block or set) of first electrodes, which go from the electrode $J_4$ to the electrode $J_{20}$, and a second sub-array of second electrodes, which go from the electrode $J_{21}$ to the electrode $J_n$, which are basically connected together in common or in parallel. The number of sub-arrays of electrodes can be increased in order to obtain longer or shorter level sensors, i.e., in order to enable different level measurements.

In an embodiment of this type, the aforesaid control or comparators means implemented in the controller 24 are prearranged for comparing the voltage determined at the input IN corresponding to two electrodes connected in common (e.g., the electrodes $J_4$ and $J_{21}$ in parallel) with at least two corresponding reference thresholds in order to deduce whether the liquid is facing or is not facing the first detection electrode (the electrode $J_4$) and/or the corresponding second detection electrode (the electrode $J_{21}$). The measurement may be basically made according to the modalities described previously. In various embodiments, the value obtained from the measurement is compared with a number of thresholds equal to the number of electrodes connected in common incremented by 1. Hence, with reference to the example considered herein of two electrodes J in parallel, the value assumed is compared with three defined distinct thresholds: a value equal to a first threshold or within a given neighbourhood thereof (e.g. +/−40%) indicates that both of the electrodes are not facing the liquid, a value equal to a second threshold or within a given neighbourhood thereof (e.g. +/−40%) indicates that one of the electrodes (known on the basis of its physical position) is facing the liquid and the other electrode is not, and finally a value equal to a third threshold or within a given neighbourhood thereof (e.g. +/−40%) indicates that both of the electrodes are facing the liquid.

In a different embodiment, a more simplified logic of analysis is envisaged, whereby the value obtained from the differential measurement is compared with a number of thresholds equal to the number of electrodes connected in common. Hence, with reference once again to the example considered herein of two electrodes J in parallel, the differential value is compared with just two thresholds: a value above a first threshold indicates that both of the electrodes are not facing the liquid, a value between the two thresholds indicates that one of the electrodes (known on the basis of its physical position) is facing the liquid and the other electrode is not, and finally a value below the second threshold indicates that both of the electrodes are facing the liquid.

Of course, on the basis of the same principle described above, there may be envisaged more than two electrodes connected in common, i.e., a number of sub-arrays with the respective electrodes in parallel, in which case the number of reference thresholds for each input IN will be equal to the number of electrodes of each parallel incremented by 1 or else equal to the number of electrodes of each parallel, according to the analysis approach implemented.

Also to this plurality of thresholds there applies what has been described previously with reference to a single threshold. For example, the various thresholds could be recalculated and shifted, or else the curves or the values detected could be translated so as to reposition them better with respect to the thresholds, in order to guarantee a correct dynamics of the signal.

Thanks to its nature with discrete detection elements, the sensor according to the invention is able to carry out level measurements in a wide range of situations, which occur for example in SCR systems. A first situation is the typical one, already described previously, where the liquid contained in the tank is entirely in the fluid state. A second situation is the one that may arise in the case where the tank is operating in conditions of low temperature, such as to produce total freezing of the liquid present in the tank. Also in this case, the sensor 10 is perfectly capable of recognizing the electrodes facing the frozen mass, and hence calculating its height. A third situation is the one in which the tank contains a predominant liquid part floating on or immersed in which are frozen parts ("iceberg effect"): also in this case, the level measurement made by the sensor 10 can be carried out with the modalities already described above, given that the presence of frozen parts does not affect operation of the sensor 10 and calculation of the level. Similar considerations apply to the case where there exists a direct transition between liquid and ice.

The sensor 10 is also able to carry out detections in mixed situations, when the liquid-ice system is freezing or thawing. A case of this type is illustrated schematically in FIG. 18, where in the upper part of the tank 1 frozen liquid is present, designated by I, that forms a partial or total "cap". In the bottom part of the tank 1, at a higher temperature, the content L of the tank is already in the liquid form, and between the solid part I and the liquid part L air or vacuum is present, designated by A. Such a condition may, for example, arise in the case of use of the liquid L contained in the tank before it has frozen completely or else after there has been obtained a partial thawing of the contents of the tank via a heater. In such a case, to the part of liquid used there substantially corresponds an intermediate empty area or area with air between the liquid and the ice. In a condition this type, it is advantageous to detect the level of the liquid in order to prevent complete use thereof, i.e., in order to leave at least a part of liquid in the tank, for the reasons clarified hereinafter.

Also in a condition of the type exemplified, the control electronics of the sensor 10 is able to identify correctly the presence of one or more electrodes ($J_4$, $J_{20}$) facing the liquid L, followed by the presence of one or more electrodes ($J_{21}$, $J_{37}$) facing the air A, in turn followed by one or more electrodes ($J_{38}$, $J_n$) facing the ice I. Advantageously, in a situation this type, the control electronics of the sensor according to the invention is able to define both the quantity/level of liquid contents L, which is important because it is the part that can be directly used at the moment by the SCR system, and the total amount of liquid (L+I) present in the tank, which is important for planning topping-up of the tank 1. A possible control logic that can be used for detecting the so-called "igloo effect" (presence of a layer of air overlaid by a layer of ice) may be the following:

- only and all the detection electrodes that are "dry", i.e., facing the air, are considered;
- the information acquired on a certain number (e.g. 3) of electrodes subsequent to a dry electrode considered is evaluated (where by "subsequent electrodes" are meant the electrodes above the dry electrode considered, in the case of installation of the sensor from beneath, or else below the dry electrode considered, in the case of installation of the sensor from above);
- a check is made to verify whether above a "dry" electrode an electrode—of the aforesaid subsequent electrodes— is present that is facing the liquid; for this purpose, in a preferred embodiment, the difference is computed between the measurements carried out on the aforesaid subsequent electrodes and the measurement of the "dry" electrode considered, comparing the three individual results with absolute thresholds defined in the design stage: if at least one of these differences coincides with or is in the given neighbourhood of the threshold defined we are in the presence of the "igloo effect".

Figure 18:
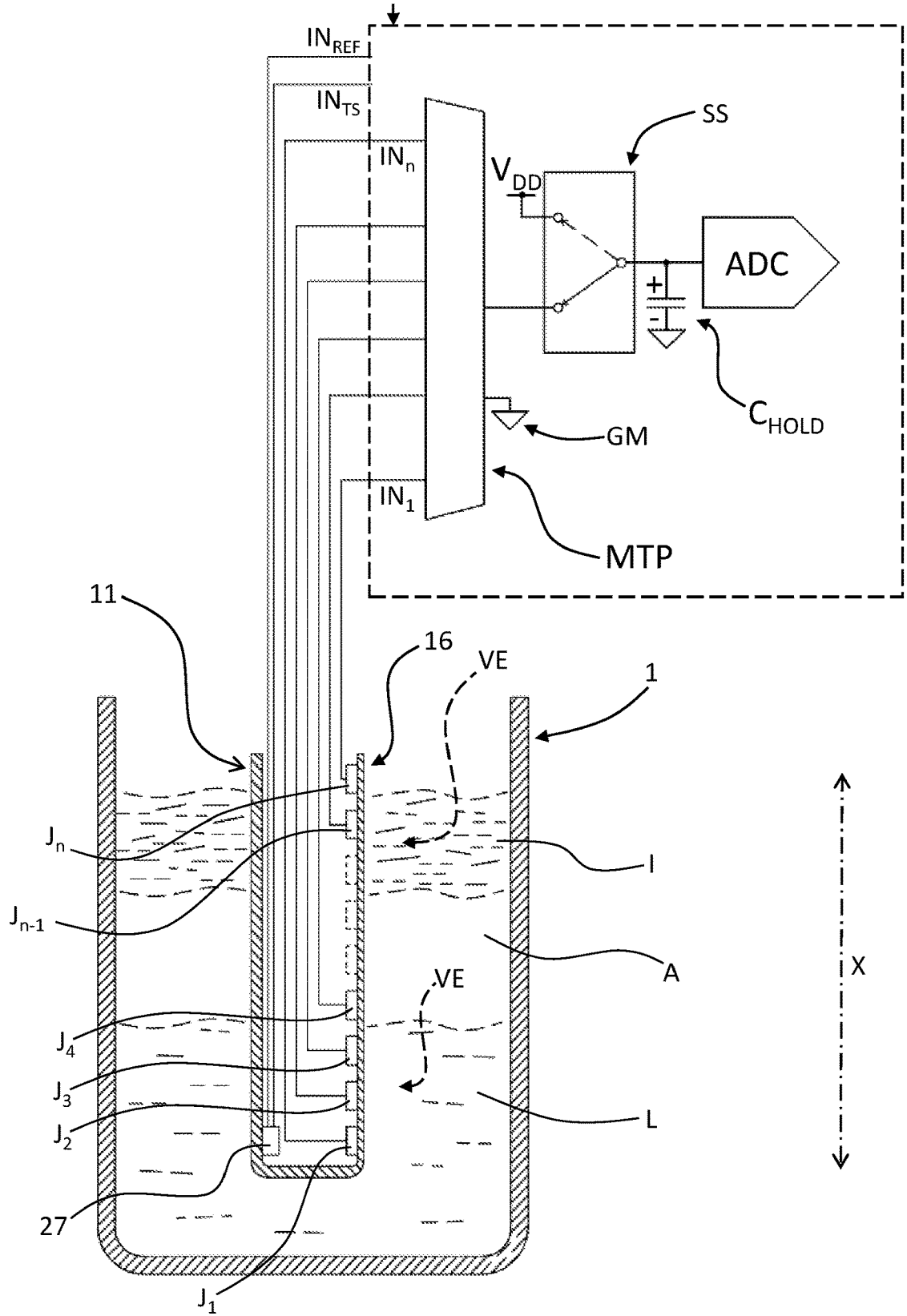
FIG. 18 is a partial and schematic representation, similar to that of FIG. 10, aimed at exemplifying a possible condition of use of a level-sensor device according to a possible embodiment of the invention.

It is also possible that, starting from a situation of the type represented in FIG. 18, a topping-up of the tank is carried out, hence introducing a part of liquid L, which could be blocked by the cap of ice I that is still present in the tank 1. On the basis of the principles set forth above, also in this case the sensor according to the invention is evidently able to detect the increase in the total level of liquid present in the tank 1. Once again with reference to situations of the type represented in FIG. 18, it will be appreciated that, if need be, the electronics of the sensor 10 can be programmed for execution of successive measurements, spaced apart by a certain period of time (e.g., two minutes), in order to verify the progressive evolution of thawing of the cap of ice I.

The temperature information that can be acquired via the sensor 27 and/or 26 can be used by the electronics 23 to recognize the situation of the tank system, for example to deduce the condition of freezing of the liquid and activate a corresponding heater.

It is to be pointed out that, to be able to cause via a heater thawing of certain frozen liquids, such as the additive AdBlue considered herein, it is necessary for there to be in any case present in the tank a part of melted liquid so that the heater can continue to heat the liquid, and this transmits the heat to the frozen mass. In the application to an SCR system, when the engine of the vehicle is started, an intake of the additive occurs, and this is not a source of particular problems in the case where in the tank there in any case still remains a certain amount of heated additive, which can reach the frozen mass by virtue of the movement of the vehicle and of consequent agitation of the hot liquid in the tank 1. If, instead, the initial intake of the additive determines emptying-out of the entire liquid residue of the contents of the tank, the thawing effect stops. For this reason, in a preferred embodiment, the sensor according to the invention can be prearranged, for example at a software level, for detecting the level of the melted liquid so as to guarantee in any case the presence of a minimum level thereof, sufficient for the effect of thawing not to be stopped. For this purpose, the sensor 10 can generate an appropriate signal or datum towards the outside, which can be used, for example, by the electronics on board the vehicle and/or for generating appropriate warnings.

It will of course be appreciated that with the sensor forming the subject of the invention it is also possible to detect easily progressive thawing of the frozen mass of liquid, as this thawing proceeds. The sensor 10 is of course able to operate during heating and/or thawing of the liquid or other medium the level of which may be measured, as well as in the course of its possible freezing.

The sensor 10 is interfaced with an external control system, such as a control unit of the SCR system via the connector 12b. For this purpose, the control electronics 23 of the sensor is pre-arranged for transmission of data, preferably in a serial format, very preferably via a serial interface and/or protocol, preferably a SENT (Single Edge Nibble Transmission) or CAN (Controller Area Network) protocol.

In addition to the typical parameters, such as the value of the level and of the temperature of the liquid in the tank and possible fault conditions, the signals or data transmitted that can be obtained via the sensor according to the invention may comprise information representing the value or capacitance or impedance or temperature detected directly by each individual electrode J or calculated mathematically on the basis of the above individual detections, such as the values of all or at least part of the electrodes J, in particular of the compensated measurement values for each individual electrode J, preferably temperature-compensated values and/or values compensated with respect to the temperature gradient along the level sensor, and/or values compensated with respect to other variables, for example ageing of the product. Moreover other values can be transmitted that are associated to at least some or all of the electrodes J, such as calibration and/or threshold or reference and/or temperature values.

For this purpose, the controller 24 of the level sensor 10 stores the values and/or data and/or information representing the value or capacitance or impedance detected by each individual electrode J, i.e., of all the electrodes J, in particular the compensated measurement values for each individual electrode J. When the above data or values are necessary, the controller 24 of the sensor 10 can send them or render them accessible for example to an electronic control unit of the vehicle, in particular in sequence or in a serial way via the aforesaid communication protocol.

It is once again to be emphasized that the calculations and/or processing operations regarding the methodologies described previously may be totally or in part performed or implemented outside the sensor 10, i.e., not necessarily using a circuit arrangement of the type designated by 23, which could hence also be implemented totally or in part in an external electronic circuit, such as an electronic control unit on board a vehicle. Such an external circuit could hence be prearranged—i.e., it comprises means—for receiving signals or data that can be obtained via the detection part 11, and for subsequently processing them in order to implement at least part of the functions or methodologies forming the subject of the present invention. Hence, in implementations of this type, the device according to the invention may comprise parts in remote positions, such as a detection part, substantially corresponding to the part previously designated by 11, and a processing and/or control part, for example integrated in a control unit or in a circuit in a remote position with respect to the container associated to which is the detection part, and pre-arranged for receiving therefrom the necessary signals or data.

From the foregoing description, the characteristics of the present invention emerge clearly, as likewise its advantages, which are mainly represented by the simplicity of production of the level-sensor device proposed, by its contained cost, and by its precision and reliability, also in the presence of temperature gradients or variations due to conditions of freezing and/or solidification and/or heating of the medium undergoing detection.

The sensor device according to the invention is more precise and immune from environmental disturbance, due for example to temperature variations and/or temperature gradients of the fluid undergoing detection and/or of the environment within the container of the fluid. In fact, the temperature compensation provided herein enables to face the variations of the physical characteristics of the sensor due to the variation of the surrounding temperature.

The level-sensor device proposed moreover enables detection of temperature variations at each individual electrode, in particular through detection of the value of capacitance and/or variations of the capacitance or impedance of each electrode, with a consequent reduction to a minimum of the use of dedicated temperature sensors.

It is clear that numerous variations may be made by the person skilled in the art to the devices and methods described herein by way of example, without thereby departing from the scope of the invention as defined by the annexed claims.

As mentioned previously, the measurements of capacitance necessary for implementation of the invention can be performed in a direct or indirect way also with sampling or measurement circuits different from the ones exemplified in FIG. 10, such as circuits designed to convert the capacitance at an input IN into an equivalent resistance: for these cases, for example, a modulator (such as a modulator of a Sigma-Delta type) can be used to convert the current measured via the aforesaid equivalent resistance into a digital count: when the medium L is facing an electrode J, the capacitance increases, and the equivalent resistance decreases: this causes a variation (typically an increase) in the current through the resistance, with a consequent variation (typically an increase) of the digital count, which can be deemed as representing the presence of the medium facing the electrode. Hence, in general, there may be provided a sampling or measurement circuit operatively connected or connectable to each input IN of the plurality of inputs $IN_1$–$IN_n$, configured for converting a capacitance at input into an equivalent resistance and for converting a current measured via the equivalent resistance into a digital count representing the value of capacitance at input. The aforementioned sampling or measurement circuit preferably includes a switched-capacitor module ($S_1$, $S_2$) and counter means. Also in implementations of this type, the value of count determined each time at the input IN considered can be compared with one or more reference thresholds and/or be a differential value with respect to one or more reference electrodes, with an approach similar to the one described previously in relation to measurements of capacitance based upon voltage values.

The invention has been described with particular reference to detection of the level of a liquid medium, in particular a urea-based additive, but, as already mentioned, the sensor described, may be used in combination with different substances and materials, even potentially subject to solidification for reasons other than freezing (consider a mass of a powdery material or the like a part of which is compacted or solidified, for example on account of excessive humidity).

The invention claimed is:

1. A capacitive level-sensor device, for detecting the level of at least one medium contained in a container, the device comprising at least:
   a detection part that includes an array of capacitive elements, the array of capacitive elements comprising at least one series of electrodes on a substrate, the series or each series comprising a plurality of electrodes that are spaced apart from one another according to an axis of detection of the level, the detection part including at least one insulating layer for electrically insulating the electrodes with respect to the at least one medium; and
   a control circuit having a plurality of first inputs, to which the electrodes are electrically connected,
   wherein the control circuit is prearranged for carrying out a sequential sampling of the inputs of the plurality of first inputs and for comparing a value representative of electrical capacitance associated to each electrode with at least one corresponding reference threshold or value,
   wherein the detection part further comprises a temperature sensor for the series, or for each series, the temperature sensor or each temperature sensor being connected to a respective second input of the control circuit,
   wherein the control circuit is moreover prearranged for carrying out a compensation of at least one from among:
     the value representative of electrical capacitance associated to each electrode;
     a value indicative of the medium facing each electrode; and
     the at least one reference threshold or value,
   as a function of information representative of at least one temperature value acquired at the second input, or at each second input,
   wherein the temperature sensor, or each temperature sensor, is set in an end region of the series, or of each series, in particular a lower end region thereof, and
   wherein the control circuit is prearranged for detecting a temperature gradient along the axis of detection from the first end region to a second end region of the series, or of each series, as a function of information representative of a temperature value acquired at the at second input via the respective temperature sensor.

2. The device according to claim 1, wherein:
   the temperature sensor, or each temperature sensor, is in a position corresponding to a first electrode of the series, or of a first electrode of each series, said first electrode being a reference electrode for detection of the series, or of each series, with reference to the axis of detection; and
   the control circuit is prearranged for carrying out compensation of a raw value representative of electrical capacitance associated to a given electrode of the series, or of each series, on the basis of a value representative of temperature or electrical capacitance compensated in temperature that is associated to the electrode of the same series that is located immediately below the given electrode with reference to the axis of detection.

3. The device according to claim 1, wherein:
   the at least one reference threshold or value is a fixed threshold or value; and
   the control circuit is prearranged for carrying out said compensation via modification of at least one value representative of the medium that can face each electrode or at least one value of electrical capacitance that can be detected by each electrode of the series, or of each series, as a function of the information representative of the temperature value acquired at the second input.

4. The device according to claim 1, wherein the control circuit is prearranged for carrying out compensation of the at least one reference threshold or value by modifying the threshold or the value itself.

5. The device according to claim 4, wherein the control circuit is prearranged for modifying the at least one reference threshold or value as a function of at least one from among: information representative of the temperature value acquired at the second input; and a value indicative of the medium that can face each electrode or representative of an electrical capacitance that can be detected by each electrode.

6. The device according to claim 1, wherein:
   the detection part comprises a plurality of temperature sensors;
   the array of capacitive elements comprises a plurality of said series of electrodes, the electrodes of each said series being equal to each other, the electrodes of one said series being different from the electrodes of another said series for at least one of shape and dimensions of the corresponding electrodes;

each of said series of electrodes has associated thereto a single one of said temperature sensors; and each temperature sensor is positioned in the detection part in a position corresponding to a predefined electrode of each series, said predefined electrode being the lowermost electrode of the series with reference to the axis of detection.

7. The device according to claim 1, wherein the control circuit is prearranged for detecting one or more of the following conditions:
   a medium contained in the container is entirely in the fluid state;
   a medium contained in the container has entirely passed from a fluid state to a solid or frozen state;
   a medium contained in the container has a predominant fluid part where there float or are immersed parts of the medium in the solid or frozen state ("iceberg effect");
   a medium contained in the container is in a phase of passage from a fluid state to a solid state or vice versa, such as freezing or unfreezing;
   a medium contained in the container includes at least one first part in the solid or frozen state and a second part in the fluid or liquid state, there being set between the first part and the second part a layer of air or gas ("igloo effect"); and
   a medium contained in the container comprises at least one part in the solid or frozen state overlaid by a part in the fluid or liquid state.

8. The device according to claim 1, wherein the control circuit comprises one or more from among:
   an arrangement for measuring electrical capacitance, preferably comprising a sampling circuit operatively connected or connectable to each input of the plurality of first inputs;
   a comparator arrangement, in particular configured for comparing a value determined at one said input with at least one corresponding reference threshold or value;
   a memory arrangement; and
   a multiplexer arrangement.

9. A method for detecting the level of at least one medium contained in a container, the method comprising:
   providing a detection part that includes an array of capacitive elements, the array of capacitive elements comprising at least one series of electrodes on a substrate, the electrodes being spaced apart from one another according to an axis of detection of the level;
   providing at least one temperature sensor in the detection part;
   providing a control circuit having a plurality of first inputs, to which the electrodes are electrically connected, and at least one second input, to which the at least one temperature sensor is electrically connected;
   carrying out a sequential sampling of the inputs of the plurality of first inputs; and
   comparing a value representative of the electrical capacitance associated to each electrode with at least one corresponding reference threshold or value,
   the method comprising the step of carrying out a compensation of at least one from among:
     the value representative of electrical capacitance associated to each electrode;
     a value indicating the medium facing each electrode; and
     the at least one reference threshold or value,
   as a function of information representative of a value of temperature acquired via the at least one temperature sensor, wherein said compensation comprises the steps of:
   i) measuring one said representative value not compensated in temperature $P_1$ for the first electrode of the series;
   ii) measuring effective temperature in a position corresponding to the first electrode, via the at least one temperature sensor positioned in the same area as the first electrode;
   iii) applying a compensation mathematics to said representative value not compensated in temperature $P_1$ of step i), using the measurement supplied by the at least one temperature sensor of step ii), thereby obtaining a representative value compensated in temperature $P_1$ Comp for the first electrode;
   iv) measuring one said representative value not compensated in temperature $P_2$ for a second electrode of the series;
   v) calculating the difference $D_2$ between said representative value not compensated in temperature $P_2$ of the second electrode and said representative value not compensated in temperature $P_1$ of the first electrode, by the formula $D_2=P_2-P_1$;
   vi) calculating the difference $D_1$ between said representative value compensated in temperature $P_1$ Comp of the first electrode and said representative value not compensated in temperature $P_2$ of the second electrode, by the formula $D_1=P_1$ Comp$-P_1$;
   vii) calculating a compensated threshold $T_1$ Comp for the first electrode as algebraic sum of a predefined nominal threshold $T_1$ thereof and half of the difference $D_1$ of step vi), by the formula $T_1$ Comp$=T_1+D_1/2$;
   viii) calculating a compensated threshold $T_2$ Comp for the second electrode as algebraic sum of a predefined nominal threshold $T_2$ thereof and half of the difference of step v), by the formula $T_2$ Comp$=T_2+D_2/2$;
   ix) repeating steps vii) and viii) to obtain all the values of the thresholds compensated in temperature $T_x$ Comp of the possible remaining electrodes of the series starting from the corresponding predefined nominal thresholds $T_x$, by the formula $T_x$ Comp$=T_x+D_x/2$ with $D_x=P_x-P_{x-1}$, where x ranges between 3 and the number of the electrodes of the series.

10. The method according to claim 9, comprising:
    positioning the at least one temperature sensor, or each temperature sensor, in a position corresponding to a first electrode of the series, or in a position corresponding to a first electrode of each series, said first electrode being a reference electrode for the detection of the series, or of each series, with reference to the axis of detection; and
    carrying out compensation of a raw value representative of electrical capacitance associated to a given electrode of the series, or of each series, on the basis of a value representative of temperature or of electrical capacitance compensated in temperature that is associated to the electrode of the same series that is located immediately underneath the given electrode, with reference to the axis of detection.

11. The method according to claim 9, comprising:
    predefining the at least one reference threshold or value as fixed threshold or value; and
    carrying out said compensation via modification of at least one value representative of the medium that can face each electrode of the series or at least one value of electrical capacitance that can be detected by each electrode of the series, or of each series, as a function of information representative of the value of temperature acquired via the at least one temperature sensor.

12. The method according to claim 9, comprising:
carrying out compensation of the at least one reference threshold or value by modifying the threshold or value itself, in particular as a function of at least one of:
information representative of the value of temperature acquired via the at least one temperature sensor; and
a value indicative of the medium that can face each electrode or representative of an electrical capacitance that can be detected by each electrode.

13. The method according to claim 9, comprising:
providing the detection part with a plurality of temperature sensors;
providing the array of capacitive elements with a plurality of series of electrodes, the electrodes of each series being equal to each other, the electrodes of one series being different from the electrodes of another series for at least one of the shape and the dimensions of the corresponding electrodes;
associating to each of said series of electrodes a single one of said temperature sensors; and
positioning each temperature sensor on the detection part in a position corresponding to a predefined electrode of each series, said predefined electrode being preferably the lowermost electrode of the series with reference to the axis of detection.

14. The method according to claim 9, comprising:
arranging the at least one temperature sensor in an end region of the detection part, in particular a lower end region thereof; and
detecting a temperature gradient along the axis of detection from the first end region to a second end region of the detection part, as a function of information representative of at least one value of temperature acquired via the at least one temperature sensor.

15. A capacitive level-sensor device, for detecting the level of at least one medium contained in a container, the device comprising at least:
a detection part that includes an array of capacitive elements, the array of capacitive elements comprising at least one series of electrodes on a substrate, the electrodes being set at a distance from one another according to an axis of detection of the level; and
a control circuit having a plurality of first inputs, to which the electrodes are electrically connected,
wherein the detection part further comprises at least one temperature sensor, connected to at least one respective second input of the control circuit,
wherein the control circuit is prearranged for deducing the medium facing each electrode and/or the level thereof and/or for detecting a temperature gradient along the axis of detection on the basis of information acquired via the electrodes and of information acquired via the at least one temperature sensor,
wherein the control circuit comprises a controller and a memory integrated or associated thereto, the memory comprising instructions implementing the method of claim 9.

16. A method for detecting the level of at least one medium contained in a container, the method comprising:
providing a detection part that includes an array of capacitive elements, the array of capacitive elements comprising at least one series of electrodes on a substrate, the electrodes being spaced apart from one another according to an axis of detection of the level;
providing at least one temperature sensor in the detection part;
providing a control circuit having a plurality of first inputs, to which the electrodes are electrically connected, and at least one second input, to which the at least one temperature sensor is electrically connected;
carrying out a sequential sampling of the inputs of the plurality of first inputs; and
comparing a value representative of the electrical capacitance associated to each electrode with at least one corresponding reference threshold or value,
the method comprising the step of carrying out a compensation of at least one from among:
the value representative of electrical capacitance associated to each electrode;
a value indicating the medium facing each electrode; and
the at least one reference threshold or value,
as a function of information representative of a value of temperature acquired via the at least one temperature sensor,
wherein said compensation comprises the steps of:
i) measuring one said representative value not compensated in temperature $P_1$ for a first electrode of the series;
ii) measuring effective temperature in a position corresponding to the first electrode, via the at least one temperature sensor positioned in the same area as the first electrode;
iii) applying a compensation mathematics to said representative value not compensated in temperature of step i), using the measurement supplied by the at least one temperature sensor of step ii), thereby obtaining a representative value compensated in temperature $P_1$ Comp for the first electrode;
iv) measuring one said representative value not compensated in temperature $P_2$ for a second electrode of the series;
v) calculating the difference $D_2$ between said representative value not compensated in temperature $P_2$ of the second electrode and said representative value not compensated in temperature $P_1$ of the first electrode, by the formula $D_2=P_2-P_1$;
vi) adding to the difference $D_2$ of step v) said representative value compensated in temperature $P_1$ Comp of step iii), thereby obtaining a representative value compensated in temperature $P_2$ Comp for the second electrode, by the formula $P_2$ Comp=$D_2$+$P_1$ Comp;
vii) repeating steps v) and vi) to obtain all the representative values compensated in temperature $P_x$ Comp of the possible remaining electrodes of the series, by the formula $P_x$ Comp=$D_x$+$P_{x-1}$ Comp, where x ranges between 3 and the number of the electrodes in the series, or else repeating steps v) and vi) using always in step vi) said representative value compensated in temperature $P_1$ Comp of the first electrode, to obtain all the representative values compensated in temperature $P_x$ Comp of the possible remaining electrodes of the series, by the formula $P_x$ Comp=$D_x$+$P_1$ Comp, where x ranges between 3 and the number of the electrodes in the series.

17. A capacitive level-sensor device, for detecting the level of at least one medium contained in a container, the device comprising at least:
a detection part that includes an array of capacitive elements, the array of capacitive elements comprising at least one series of electrodes on a substrate, the electrodes being set at a distance from one another according to an axis of detection of the level; and a control circuit having a plurality of first inputs, to which the electrodes are electrically connected, wherein the detection part further comprises at least one temperature sensor, connected to at least one respective second input of the control circuit, wherein the control circuit is prearranged for deducing the medium facing each electrode and/or the level thereof and/or for detecting a temperature gradient along the axis of detection on the basis of information acquired via the electrodes and of information acquired via the at least one temperature sensor, wherein the control circuit comprises a controller and a memory integrated or associated thereto, the memory comprising instructions implementing the method of claim 16.

18. A method for detecting the level of at least one medium contained in a container, the method comprising:

providing a detection part that includes an array of capacitive elements, the array of capacitive elements comprising at least one series of electrodes on a substrate, the electrodes being spaced apart from one another according to an axis of detection of the level;

providing at least one temperature sensor in the detection part;

providing a control circuit having a plurality of first inputs, to which the electrodes are electrically connected, and at least one second input, to which the at least one temperature sensor is electrically connected;

carrying out a sequential sampling of the inputs of the plurality of first inputs; and comparing a value representative of the electrical capacitance associated to each electrode with at least one corresponding reference threshold or value, the method comprising the step of carrying out a compensation of at least one from among:

the value representative of electrical capacitance associated to each electrode;

a value indicating the medium facing each electrode; and the at least one reference threshold or value, as a function of information representative of a value of temperature acquired via the at least one temperature sensor, wherein said compensation comprises the steps of:

i) measuring one said representative value not compensated in temperature $P_1$ for the first electrode;

ii) measuring effective temperature in a position corresponding to the first electrode, via the at least one temperature sensor positioned in the same area as the first electrode;

iii) applying a compensation mathematics to said representative value not compensated in temperature $P_1$ of step i), using the measurement supplied by the at least one temperature sensor of step ii), thereby obtaining a temperature-compensated representative value $P_1$ Comp for the first electrode;

iv) measuring one said representative value not compensated in temperature $P_2$ for the second electrode;

v) calculating the difference $D_2$ between said representative value not compensated in temperature $P_2$ of the second electrode and said representative value not compensated in temperature $P_1$ of the first electrode, by the formula $D_2=P_2-P_1$;

vi) adding to the difference $D_2$ of step v) said representative value compensated in temperature $P_1$ Comp of step iii), thereby obtaining a temperature-compensated representative value $P_2$ Comp for the second electrode, by the formula $P_2$ Comp=$D_2$+$P_1$ Comp;

where, in the absence of detection of a transition between two different media in the container, the following step is carried out;

vii-a) repeating steps v) and vi) to obtain all the representative values compensated in temperature $P_x$ Comp of the possible remaining electrodes of the series, by the formula $P_x$ Comp=$D_x$+$P_{x-1}$ Comp, where x ranges between 3 and the number of the electrodes in the series;

or else, in the presence of detection of a transition between two different media in the container, the following step is carried out;

vii-b) repeating steps v) and vi) using in step v) a value representative of the electrical capacitance compensated in temperature $P_y$ Comp of an electrode at which one said transition has been detected, to obtain all the representative values compensated in temperature $P_x$ Comp of the possible remaining electrodes of the series, by the formula $P_x$ Comp=$D_x$+$P_y$ Comp, where x ranges between 3 and the number of the electrodes in the series and y is smaller than x and identifies said electrode at which the last transition has been detected.

19. A capacitive level-sensor device, for detecting the level of at least one medium contained in a container, the device comprising at least:

a detection part that includes an array of capacitive elements, the array of capacitive elements comprising at least one series of electrodes on a substrate, the electrodes being set at a distance from one another according to an axis of detection of the level; and a control circuit having a plurality of first inputs, to which the electrodes are electrically connected, wherein the detection part further comprises at least one temperature sensor, connected to at least one respective second input of the control circuit, wherein the control circuit is prearranged for deducing the medium facing each electrode and/or the level thereof and/or for detecting a temperature gradient along the axis of detection on the basis of information acquired via the electrodes and of information acquired via the at least one temperature sensor, wherein the control circuit comprises a controller and a memory integrated or associated thereto, the memory comprising instructions implementing the method of claim 18.

20. A capacitive level-sensor device, for detecting the level of at least one medium contained in a container, the device comprising at least:

a detection part that includes an array of capacitive elements, the array of capacitive elements comprising at least one series of electrodes on a substrate, the series or each series comprising a plurality of electrodes that are spaced apart from one another according to an axis of detection of the level, the detection part including at least one insulating layer for electrically insulating the electrodes with respect to the at least one medium; and a control circuit having a plurality of first inputs, to which the electrodes are electrically connected, wherein the control circuit is prearranged for carrying out a sequential sampling of the inputs of the plurality of first inputs and for comparing a value representative of electrical capacitance associated to each electrode with at least one corresponding reference threshold or value, wherein the detection part further comprises a temperature sensor at the series, or at each series, the temperature sensor or each temperature sensor being connected to a respective second input of the control circuit,
wherein the control circuit is moreover prearranged for carrying out a compensation of at least one from among:
  the value representative of electrical capacitance associated to each electrode;
  a value indicative of the medium facing each electrode;
  the at least one reference threshold or value,
as a function of information representative of at least one temperature value acquired at said respective second input,
wherein the temperature sensor, or each temperature sensor, is in a position corresponding to a first electrode of the series, or of a first electrode of each series, said first electrode being a reference electrode for detection of the series, or of each series, with reference to the axis of detection;
and wherein the control circuit is prearranged for carrying out compensation of a raw value representative of electrical capacitance associated to a given electrode of the series, or of each series, on the basis of a value representative of temperature or of electrical capacitance compensated in temperature that is associated to the electrode of the same series that is located immediately below the given electrode, with reference to the axis of detection.

* * * * *